United States Patent [19]

Imamura et al.

[11] Patent Number: 5,744,118
[45] Date of Patent: Apr. 28, 1998

[54] METHOD FOR THE SYNTHESIS OF MIXED METAL OXIDE POWDERS

[75] Inventors: Kunio Imamura, Tokyo, Japan; John F. DiGregorio, Los Lunas; Douglas M. Smith, Albuquerque, both of N. Mex.; Hirozumi Izawa, Chiba; Tetsuhiko Yamaguchi, Kawasaki, both of Japan

[73] Assignee: Showa Denko K.K., Tokyo, Japan

[21] Appl. No.: 413,472

[22] Filed: Mar. 28, 1995

Related U.S. Application Data

[63] Continuation-in-part of Ser. No. 282,509, Aug. 3, 1994.
[51] Int. Cl.$^6$ .............. C01F 1/00; C01G 25/00; C01G 1/00
[52] U.S. Cl. .............. 423/593; 423/263; 423/598; 423/600
[58] Field of Search .............. 423/263, 266, 423/593, 598, 600

[56] References Cited

U.S. PATENT DOCUMENTS

| | | | |
|---|---|---|---|
| 3,397,257 | 8/1968 | Brambilla et al. | 423/604 |
| 3,846,527 | 11/1974 | Winter et al. | 264/63 |
| 4,485,085 | 11/1984 | David et al. | 423/594 |
| 4,520,114 | 5/1985 | David | 423/266 |
| 5,300,606 | 4/1994 | Aizawa | 526/307.6 |

FOREIGN PATENT DOCUMENTS

0473881A1  5/1991  European Pat. Off.

*Primary Examiner*—Steven Bos
*Attorney, Agent, or Firm*—Sughrue, Mion, Zinn, Macpeak & Seas, PLLC

[57] ABSTRACT

A technique to synthesize complex oxide ceramic powders which offers advantages of both the coprecipitation and sol-gel routes while doing away with the disadvantages is disclosed. Namely, the ability to achieve chemical homogeneity and crystallite size on the nanometer length scale at a nonprohibitive cost is provided by the disclosed method. In one embodiment of the invention, a method for the synthesis of a mixed metal oxide powder is provided including (a) combining a liquid absorbent resin with at least one solution selected from the group consisting of solutions containing at least one organo-metallic compound and solutions containing at least one metallic salt compound, such that at least two metals are present in the liquid absorbent resin after the combining is completed; (b) after the combining, allowing the liquid absorbent resin to swell and gel and thereby form a swollen gel; (c) preparing a precursor material by changing at least one of the pH and temperature of the swollen gel; (d) pyrolyzing the precursor material to form a pyrolyzed precursor material; and (e) calcining the pyrolyzed precursor material to form a mixed metal oxide powder.

6 Claims, 22 Drawing Sheets

FIG.6A
FIG.6B
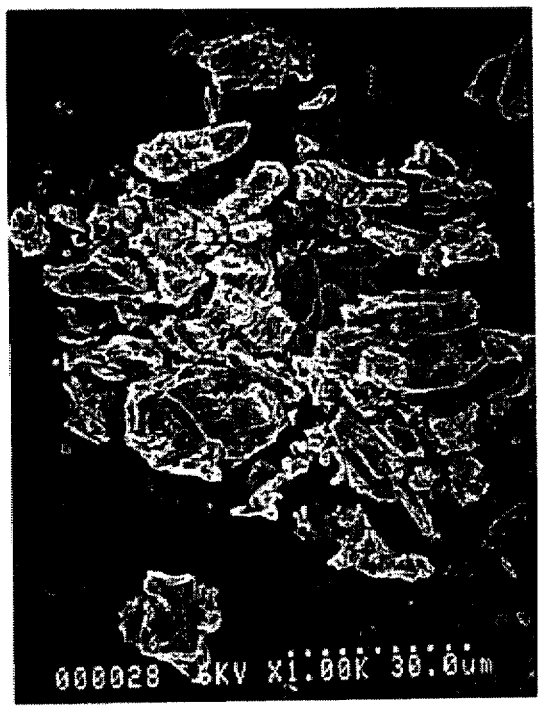
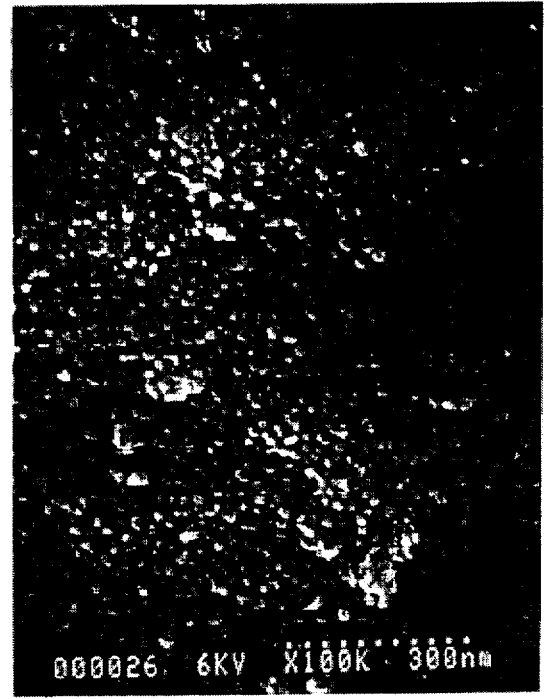

FIG.7A
FIG.7B

FIG.22A
FIG.22B

METHOD FOR THE SYNTHESIS OF MIXED METAL OXIDE POWDERS

This is a continuation-in-part of Application Ser. No. 08/282,509, filed Aug. 3, 1994.

BACKGROUND OF THE INVENTION

1. Field of the Invention

The present invention relates to a method for the synthesis of mixed metal oxide powders. More particularly, the present invention is directed to a technique for the synthesis of complex oxide ceramic powders using liquid absorbent resin gels.

2. Description of the Related Art

Multicomponent oxide ceramic powders are used for many current industrial electronics applications such as capacitors, filters, oxygen sensors, and PTC controllers, as well as a large future market involving high temperature superconducting ceramics. A complex or multicomponent oxide ceramic is defined as an oxide compound containing two or more metal atoms. The general form of the oxide compound can be written, for example, as $M_aN_bP_cO_d$, where M, N, and P are metal atoms, O is oxygen, and a, b, c, and d are integer, or non-integer, numbers defining the stoichiometry of the compound. In order to obtain the desired electrical properties, many applications require the use of three or more components, which makes obtaining chemical mixing on small scales (1–100 nm) difficult. Also, synthesizing submicron particle sizes results in lowered sintering temperatures, smaller grain sizes, and improved electrical properties.

Conventional powder synthesis schemes such as coprecipitation or repeated ball milling of a mixture of individual oxide powders offer the advantage of inexpensive precursors, but they result in nonhomogeneous powders of fairly large size and the introduction of impurities. Sol-gel routes may be employed to obtain mixing at the molecular scale (with careful choice of the precursor alkoxides and control of the hydrolysis/condensation conditions), but they involve the use of very expensive precursors and thus become prohibitive in cost.

SUMMARY OF THE INVENTION

Accordingly, an object of the present invention is to synthesize complex oxide ceramic powders using a technique which offers advantages of both the coprecipitation and sol-gel routes while doing away with the disadvantages. Namely, the ability to achieve chemical homogeneity and crystallite size on the nanometer length scale without significant agglomeration and at a nonprohibitive cost is an object of the present invention. Another object of the present invention is to provide the ability to tailor powder properties over a wide range. A further object of the present invention is to provide a synthesis method which can use a water-based solvent system instead of the organic solvents used in the sol-gel and emulsion techniques. The invention technique utilizes organic polymer gels that absorb large amounts of aqueous and/or organic solvent solutions containing the desired metal salts (and/or other metal-containing compounds including, but not limited to, metal alkoxides and organo-metallic compounds) in the correct stoichiometry. By changing the pH and/or temperature of the gel swollen with solution, the oxides, or precursor salts, are precipitated and, as a result of the partitioning of the solution by the organic gel network, the oxide-gel composite is chemically mixed on the nanometer length scale. Upon pyrolysis (the burning of the gel in an oxidizing environment), a soft agglomerated oxide mass is obtained which may be easily reduced to a submicron powder (if the pyrolysis takes place in a non-oxidizing environment, the reaction product is typically a compound containing carbon atoms).

To achieve the above and other objects, the present invention is directed to a method for the synthesis of a mixed metal oxide powder, comprising the following steps:

(a) combining a liquid absorbent resin with at least one solution selected from the group consisting of solutions containing at least one organo-metallic compound and solutions containing at least one metallic salt compound, such that at least two metals are present in the liquid absorbent resin after said combining is completed;

(b) after said combining, allowing the liquid absorbent resin to swell and gel and thereby form a swollen gel;

(c) preparing a precursor material by changing at least one of the pH and temperature of the swollen gel;

(d) pyrolyzing the precursor material to form a pyrolyzed precursor material; and (e) calcining the pyrolyzed precursor material to form a mixed metal oxide powder.

Also, the present invention is directed to a method for the synthesis of a mixed metal oxide powder, comprising the following steps:

(a) combining a liquid absorbent resin with at least one of (i) at least one solution containing at least one organo-metallic compound and (ii) at least one solution containing at least one metallic salt compound;

(b) after said combining, allowing the liquid absorbent resin to swell and gel and thereby form a first swollen gel;

(c) preparing a first precursor material by changing at least one of the pH and temperature of the first swollen gel;

(d) combining the first precursor material with at least one of (i) at least one solution containing at least one organic metallic compound and (ii) at least one solution containing at least one metallic salt compound;

(e) after said combining involving the first precursor material, allowing the first precursor material to swell and gel and thereby form a second swollen gel;

(f) preparing a second precursor material by changing at least one of the pH and temperature of the second swollen gel;

(g) pyrolyzing the second precursor material to form a pyrolyzed precursor material; and (h) calcining the pyrolyzed precursor material to form a mixed metal oxide powder.

BRIEF DESCRIPTION OF THE DRAWINGS

FIGS. 6A and 6B show scanning electron microscope micrographs at different degrees of magnification for indium tin oxide powder produced by using an N-vinylacetamide resin.

FIGS. 7A and 7B show scanning electron microscope micrographs at different degrees of magnification for indium tin oxide powder produced by using an acrylic acid amide resin.

FIGS. 22A and 22B show SEM micrographs of unground zirconia powders made from precursors that were milled and unmilled, respectively, prior to calcination, with a salt to resin ratio of 15:1.

DETAILED DESCRIPTION OF THE INVENTION

Figure 1:
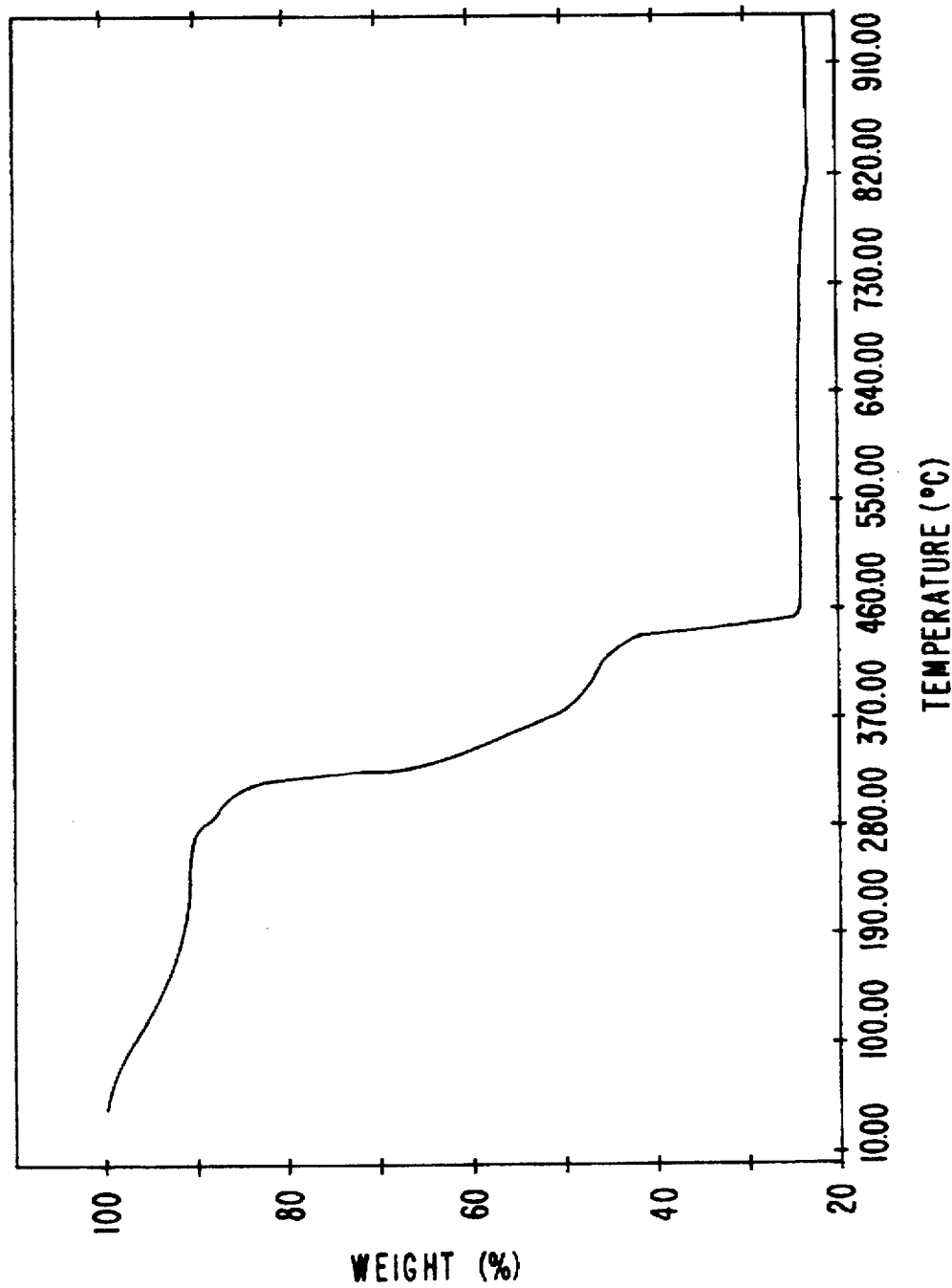
FIG. 1 illustrates thermogravimetric analysis data showing weight loss as a function of temperature for a gel-titanium isopropoxide-strontium nitrate system.

The unique property of the resins relevant to the present invention is the excellent absorption by the resin of solutions comprised of water and/or organic solvent, and metal-containing species (which can be introduced into the solvent in various forms including, but not limited to, a metal salt, a metal alkoxide, and/or organo-metallic compounds). Upon absorbing the solution, the gel (which by definition is a cross-linked, three dimensional network with cavities on the order of ten nanometers in size) effectively partitions small amounts of the solution. Upon drying and calcination, this partitioning leads to the important powder properties of chemical homogeneity and crystallite size on the nanometer length scale.

Suitable liquid absorbent resins which can be used in this invention are non-ionic resins.

Crosslinked-type N-vinylcarboxylic acid amide resins like those described in U.S. Pat. No. 5,300,606, crosslinked-type acrylic acid amide resins, or crosslinked-type vinyl alcohol resins are particularly suitable.

For example, a liquid absorbent resin suitable for the present invention can comprise, as its main component, a crosslinked N-vinyl-carboxylic acid amide resin comprising the backbone chain of a homopolymer or copolymer comprising at least 50 mole % or more of an N-vinylcarboxylic acid amide component crosslinked with a crosslinking agent, more particularly a crosslinked N-vinyl-carboxylic acid amide resin comprising a backbone chain of polymer comprising repeating units (a) or (a) and (b) of the formulas shown below crosslinked with a crosslinking agent:

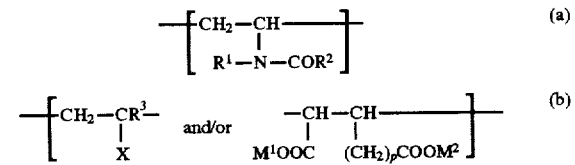

wherein $R^1$, $R^2$ and $R^3$ each represent a hydrogen atom or methyl group; X represents a group —COOY (Y represents hydrogen atom, an alkali metal, a $C_1$–$C_6$ alkyl group or a lower alkyl (e.g., $C_1$–$C_6$ alkyl) group substituted with a hydroxyl group, dialkylamino group or quaternary ammonium group), a group —CONHZ (Z represents a hydrogen atom or a lower alkyl (e.g., $C_1$–$C_6$ alkyl) group substituted with a dialkylamino group, quaternary ammonium group, sulfonic acid or an alkali metal salt thereof), cyano group, 2-ketopyrrolidinyl group, a lower alkoxy (e.g., $C_1$–$C_4$ alkoxy) group, a lower acyl group (e.g., a $C_2$–$C_4$ acyl group) a lower acyloxy group (e.g., a $C_2$–$C_4$ acyloxy group) or a lower alkyl (e.g., $C_1$–$C_3$ alkyl) group substituted with sulfonic acid or an alkali metal salt thereof, with the proviso that when $R_3$ is a methyl group, X is not a cyano group, 2-ketopyrrolidinyl group, a lower alkoxy group, a lower acyl group, a lower acyloxy group or a lower alkyl group substituted with sulfonic acid or a salt thereof; $M^1$ and $M^2$ independently represent a hydrogen atom or an alkali metal; p represents 0 or 1; and the molar ratio of (a):(b) is 50 -100:50 - 0.

Specifically, a crosslinked N-vinylcarboxylic acid amide resin comprising a backbone chain of a homo- or copolymer containing at least 50 mole % of an N-vinylcarboxylic acid amide component crosslinked with a crosslinking agent can be used, and typical specific examples of the respective monomers of the component A (N-vinylcarboxylic acid amide component) and the component B (copolymer component) of the repeating units shown by the above formula may include those as set forth below.

Component A: N-vinylformamide, N-vinylacetamide, N-methyl-N-vinylformamide, N-methyl-N-vinylacetamide or the like, particularly preferably N-vinylacetamide.

Component B: acrylic acid, methacrylic acid (i.e., "(meth) acrylic acid") or alkali metal salts thereof such as sodium salts, potassium salts, etc.; alkylesters such as methyl esters, ethyl esters, propyl esters, butyl esters, pentyl esters, and hexyl esters; hydroxy lower alkyl esters such as hydroxyethyl esters, hydroxypropyl esters, hydroxybutyl esters or the like; lower alkyl esters substituted with a lower alkylamino group such as dimethylaminomethyl esters, dimethylaminoethyl esters, dimethylaminopropyl esters, dimethylaminobutyl esters, diethylaminomethyl esters, diethylaminoethyl esters, diethylaminopropyl esters, diethylaminobutyl esters or the like; lower alkyl esters substituted with a quaternary ammonium group such as trimethylammonioethyl ester halides, trimethylammoniopropyl ester halides, triethylammonioethyl ester halides, triethylammoniopropyl ester halides or the like; amides; alkyl amides (preferably N-lower alkyl substituted amides) substituted with lower alkylamino groups such as dimethylaminomethylamides, dimethylaminoethylamides, dimethylaminopropylamides, dimethylaminobutylamides, diethylaminomethylamides, diethylaminoethylamides, diethylaminopropylamides, diethylaminobutylamides or the like; lower alkylamides substituted with a quaternary ammonium group such as trimethylammonioethylamide halides, trimethylammoniopropylamide halides, triethylammonioethylamide halides, triethylammoniopropylamide halides or the like; lower alkylamides substituted with sulfonic acid or alkali metal sulfonate such as sulfomethylamides, sulfoethylamides, sulfopropylamides, sulfobutylamides, sodium sulfomethylamides, sodium sulfoethylamides, sodium sulfopropylamides, sodium sulfobutylamides, potassium sulfomethylamides, potassium sulfoethylamides, potassium sulfopropylamides, potassium sulfobutylamides or the like; acrylonitrile; N-vinyl-2-pyrrolidone; vinyl ethers such as methyl vinyl ether, ethyl vinyl ether, propyl vinyl ether, butyl vinyl ether or the like; vinyl ketones such as methyl vinyl ketone, ethyl vinyl ketone or the like; vinyl lower carboxylates such as vinyl acetate, vinyl propionate or the like; allylsulfonic acid or alkali metal salts thereof such as allylsulfonic acid, sodium allylsulfonate, potassium allylsulfonate or the like; maleic acid, sodium maleate, potassium maleate, fumaric acid, sodium fumarate, itaconic acid, sodium itaconate, potassium itaconate and so on.

Among them, particularly (meth)acrylic acid, sodium (meth)acrylate, methyl (meth)acrylate, ethyl (meth)acrylate, propyl (meth)acrylate, butyl (meth)acrylate, hydroxyethyl (meth)acrylate, hydroxypropyl (meth)acrylate, hydroxybutyl (meth)acrylate, dimethylaminoethyl (meth)acrylate, trimethylammonioethyl (meth)acrylatechloride, acrylamide, sulfopropylacrylamide, sulfobutyl acrylamide, sodium sulfopropyl acrylamide, sodium sulfobutylacrylamide, acrylonitrile, methyl vinyl ether, ethyl vinyl ether, methyl vinyl ketone, ethyl vinyl ketone, vinyl acetate, sodium allylsulfonate, N-vinyl-2-pyrrolidone, maleic acid, sodium maleate, itaconic acid, and sodium itaconate are preferable.

In the case of a copolymer, at least 50 mole % or more of the component A must be present, as mentioned above. At a ratio lower than this, the absorbability of organic compounds cannot be fully exhibited. A preferable range of the copolymer composition depends on the kind of the liquid to be absorbed, particularly the kind of coexisting solute and the concentration, etc., and cannot be generally specified.

For the crosslinking agent, a compound having at least two polymerizable unsaturated groups in one molecule can be used, and representative examples thereof include those set forth below: N,N'-lower alkylenebisacrylamides such as N,N'-methylenebisacrylamide, N,N'-1,2-ethylenebisacrylamide or the like; N,N'-α,ω-lower alkylenebis(N-vinylcarboxylic acid amide) such as N,N'-methylenebis (N-vinylacetamide), N,N'-1,3-propylenebis (N-vinylacetamide), N,N'-1,4-butylenebis(N-vinylacetamide), N,N'-1,5-pentylenebis(N-vinylacetamide), N,N'-1,6-hexylenebis-(N-vinylacetamide), N,N'-1,7-heptylenebis(N-vinylacetamide), N,N'-1,8-octylenebis(N-vinylacetamide), N,N'-1,9-nonylenebis-(N-vinylacetamide), N,N'-1,10-decylenebis(N-vinylacetamide), N,N'-diacetyl-N,N'-divinyl-1,3-butanediamine, N,N'-diacetyl-N,N'-divinyl-2,5-hexanediamine, N,N'-diacetyl-N,N'-divinyl-2,4-pentanediamine, N,N'-diacetyl-N,N'-divinyl-2,2-diethyl-1,3-propanediamine, N,N'-diacetyl-N,N'-divinyl-2,5-dimethyl-2,5-hexanediamine, N,N'-diacetyl-N,N'-divinyl-2,4-dimethyl-2,4-pentanediamine, N,N'-diacetyl-N,N'-divinyl-2,2-dimethyl-1,3-propanediamine, N,N'-diacetyl-N,N'-divinyl-2-ethyl-1,5-hexanediamine, N,N'-diacetyl-N,N'-divinyl-2-ethyl-2-methyl-1,3propanediamine, N,N'-diacetyl-N,N'-divinyl-2-methyl-1,3-butanediamine, N,N'-diacetyl-N,N'-divinyl-2-methyl-1,5-pentanediamine, N,N'-1,3-propylenebis(N-vinylformamide), N,N'-1,4-butylenebis (N-vinylformamide), N,N'-1,5-pentylenebis(N-vinylformamide), N,N'-1,6-hexylenebis(N-vinylformamide), N,N'-1,7-heptylenebis(N-vinylformamide), N,N'-1,8-octylenebis(N-vinylformamide), N,N'-1,9-nonylenebis(N-vinylformamide), N,N'-1,10-decylenebis(N-vinylformamide), N,N'-diformyl-N,N'-divinyl-1,3-butanediamine, N,N'-diformyl-N,N'-divinyl-2,5-hexanediamine, N,N'-diformyl-N,N'-divinyl-2,4-pentanediamine, N,N'-diformyl-N,N'-divinyl-2,2-diethyl-1,3propanediamine, N,N'-diformyl-N,N'-divinyl-2,5dimethyl-2,5-hexanediamine, N,N'-diformyl-N,N'-divinyl-2,4-dimethyl-2,4-pentanediamine, N,N'-diformyl- N,N'-divinyl-2,2-dimethyl-1,3propanediamine, N,N'-diformyl-N,N'-divinyl-2-ethyl1,3-hexanediamine, N,N'-diformyl-N,N'-divinyl-2-ethyl2-methyl-1,3-propanediamine, N,N'-diformyl-N,N'-divinyl-2-methyl-1,3-butanediamine, N,N'-diformyl-N,N'-divinyl-2-methyl-1,5-pentanediamine, N,N'-diacetyl-N,N'-divinyl-1,3-bis-aminomethylcyclohexane, N,N'-diacetyl-N,N'-divinyl-1,4-bis(aminomethyl) cyclohexane, N,N'-diformyl-N,N'-divinyl-1,3-bis-(aminomethyl)-cyclohexane, N,N'-diformyl-N,N'-divinyl-1,4-bis(aminomethyl)cyclohexane or the like; N,N'-(diacetyl) -N,N'-(divinyl)-α,ω-diaminopolyethers such as N,N'-3-oxa-1,5-pentylenebis(N-vinylacetamide), N,N'-3,6-dioxa-1,8-octylene bis(N-vinylacetamide), N,N'-3,6,9-trioxa-1,11-undecylene bis(N-vinylacetamide), N,N'-3,6,9,12-tetraoxa-1,14-tetradecylene bis(N-vinylacetamide), N,N'-3-oxa-1,5-pentylene bis(N-vinylformamide), N,N'-3,6-dioxa-1,8-octylene bis(N-vinylformamide), N,N'-3,6,9-trioxa-1,11-undecylene bis(N-vinylformamide), N,N'-3,6,9,12-tetraoxa-1,14-tetradecylene bis(N-vinylformamide), N,N'1,4-dimethyl-3-oxa-1,5-pentylene bis(N-vinylacetamide), N,N'-1,4,7-trimethyl-3,6-dioxa-1,8-octylene bis(N-vinylacetamide), N,N'-1,4,7,10-tetramethyl-3,6,9-trioxa-1,11-undecylene bis(N-vinylacetamide), N,N'-1,4,7,10,13-pentamethyl-3,6,9,12-tetraoxa-1,14-tetradecylene bis(N-vinylacetamide), N,N'-1,4-dimethyl3-oxa-1,5-pentylene bis (N-vinylformamide), N,N'-1,4,7-trimethyl-3,6-dioxa-1,8-octylene bis(N-vinylformamide), N,N'-1,4,7,10-tetramethyl-3,6,9-trioxa-1,11-undecylene bis(N-vinylformamide), N,N'-1,4,7,10,13-pentamethyl-3,6,9,12-tetraoxa-1,14-tetradecylene bis(N-vinylformamide) or the like; xylylene bis(N-vinylcarboxylic acid amide) such as p-xylylene bis(N-vinyl-formamide), p-xylylenebis(N-vinylacetamide), m-xylylene bis(N-vinylformamide), m-xylylene bis(N-vinylacetamide) or the like; alkylene glycol di(meth)acrylates such as ethylene glycol di(meth) acrylate, propylene glycol di(meth) acrylate, or the like;

polyalkylene glycol di(meth)acrylates such as diethylene glycol di(meth)acrylate, triethylene glycol di(meth)acrylate, polyethylene glycol di(meth)acrylate, propylene glycol di(meth)acrylate, or the like; divinyl compounds such as divinyl benzene, divinyl ether, or the like; trifunctional group compounds such as trimethylolpropane tri(meth) acrylate, pentaerythritol tri(meth)acrylate, trimethylolpropane diallylether, pentaerythritol triallyl ether, triallyl phosphate, or the like; and so on.

Among them, N,N'-methylenebisacrylamide, N,N'-1,4-butylenebis(N-vinylacetamide), N,N'-1,6-hexylenebis(N-vinylacetamide) N,N'-1,10-decylenebis(N-vinylacetamide), N,N'-3-oxa-1,5-pentylenebis(N-vinylacetamide), N,N'-3,6-dioxa-1,8-octylenebis(N-vinylacetamide), N,N'-p-xylylenebis(N-vinylacetamide), and N,N'-diacetyl-N,N'-divinyl-1,4-bisaminomethylcyclohexane may be considered as preferable ones. A mixture of two or more compounds mentioned above can also be used.

The amount of the crosslinking agent used is preferably from $2 \times 10^{-4}$ to 1 mole %, more preferably from $2.5 \times 10^{-4}$ to 0.2 mole %, most preferably from $5 \times 10^{-4}$ to $1 \times 10^{-2}$ mole %, based on the (co)polymerized component. In this connection, when the amount of the crosslinking agent used is more than 1 mole % based on the (co)polymerized component, the obtained resin has too high a crosslinking density, whereby its absorbing performance is remarkably lowered, but when it is smaller than $2 \times 10^{-4}$ mole %, the number of polymeric chains not crosslinked is increased, whereby it becomes readily soluble in water or organic solvents and the desired performance thereof as an absorbent cannot be expected to be achieved.

The crosslinking reaction may be carried out by copolymerization of a polyfunctional monomer during polymerization, but this method is not limitative as it is also possible to effect post-polymerization crosslinking. More specifically, straight chain polymers can be crosslinked by using crosslinking agents having reactive groups such as carboxylic acid or a metal salt thereof, a glycidyl group, hydroxy groups, amino groups, etc. For example, straight chain polymers can be allowed to copolymerize with sodium acrylate within the appropriate range to react with compounds having 2 or more glycidyl groups, for example, ethylene glycol diglycidyl ether within the above-mentioned specific range. Similarly, combinations of a glycidyl group and an amine, carboxylic acid, a polyvalent metal cation, etc. are possible. In each case, the amount of crosslinking agent and the copolymer composition are important.

The polymerization process is not limited, but preferably is performed according to a method such as an aqueous solution polymerization, reverse phase suspension polymerization, or reverse phase emulsion polymerization.

For example, in the aqueous solution polymerization method, monomer components and crosslinking agents are uniformly dissolved in a solvent such as water, a hydrophilic organic solvent uniformly miscible with water, or a solvent mixture thereof, and after removal of dissolved oxygen in the system by vacuum degassing or replacement with an inert gas such as nitrogen or carbon dioxide, a polymerization initiator is added to carry out the reaction. The polymerization initiation temperature is generally about $-10°$ to $60°$ C., and the reaction time is about 1 to 10 hours.

The above-mentioned hydrophilic organic solvent includes lower alcohols such as methyl alcohol, ethyl alcohol, propyl alcohol or the like, cyclic ethers such as tetrahydrofuran, dioxane or the like, acetone, acetonitrile, N,N'-dimethylformamide, N,N'-dimethylacetamide, dimethyl sulfoxide, or the like. Among them, tetrahydrofuran, acetonitrile, N,N'-dimethyl formamide, N,N'-dimethyl acetamide, and dimethyl sulfoxide are preferred.

As the polymerization initiator, there may be employed peroxides, hydroperoxides, organic or inorganic peracids, persulfates or salts thereof, azobis type compounds uniformly soluble in solvents alone or redox type initiators by combination with a reducing agent, and representative examples thereof include those set forth below:

t-butylperoxide, t-amylperoxide, cumyl-peroxide, acetylperoxide, propionylperoxide, benzoylperoxide, benzoylisobutyrylperoxide, lauroyl peroxide, t-butyl hydroperoxide, cyclohexyl hydroperoxide, tetralin hydroperoxide, t-butyl peracetate, t-butyl perbenzoate, bis(2-ethylhexylperoxydicarbonate), 2,2-azobisisobutyronitrile, phenylazotriphenylethane, 2,2-azobis(2amidinopropane)dihydrochloride, 2,2-azobis[2-(5-methyl-2-imidazoline-2-yl)propane]dihydrochloride, 2,2-azobis[2-(2-imidazoline-2-yl)propane]dihydrochloride, sodium persulfate, potassium persulfate, ammonium persulfate, hydrogen peroxide, combinations of persulfates with tertiary amines such as triethylamine, triethanolamine, and dimethylaniline, etc.

Among these, t-butyl peroxide, benzoyl peroxide, 2,2-azobisi-butyronitrile, 2,2-azobis(2-amidinopropane) dihydrochloride, 2,2azobis [2-(5-methyl-2-imidazoline-2-yl)propane]di-hydrochloride, 2,2-azobis[2-(2-imidazoline-2-yl)propane]dihydrochloride, sodium persulfate, potassium persulfate or ammonium persulfate, or a combination of persulfates and a tertiary amine such as triethylamine, triethanolamine or dimethylaniline are preferred.

The amount of the polymerization initiator used is preferably 0.0005 to 5 mole %, more preferably 0.001 to 1 mole %, most preferably 0.005 to 0.5 mole %, based on the (co)polymer component.

The reaction product is a gel containing the solvent employed for the reaction, and is generally crushed by a rotatory system cutter. Further, the solvent is removed by a method such as heating or a reduced pressure, followed by drying, crushing and classification, to be made into a powder with a particle size of about 50μ to 1 mm.

As the reverse phase suspension polymerization and reverse phase emulsion polymerization methods, monomer components and a crosslinking agent are uniformly dissolved in water, and the solution is suspended or emulsified in an organic solvent immiscible with water to carry out the polymerization reaction. The polymerization initiator is not necessarily limited to water soluble products, and those soluble in organic solvents also can be used. Accordingly, in addition to those mentioned above, for example, those set forth below also can be used.

Examples of the organic solvents include hydrocarbons such as hexane, cyclohexane, heptane, octane, benzene, toluene, xylene and ethylbenzene; halogenated hydrocarbons such as carbon tetrachloride and dichlorethane; mineral oils such as Isopar, etc.

In the reverse phase emulsion polymerization method, a surfactant is used as the dispersing agent, optionally together with a protective colloid. Examples of such a surfactant include sorbitane monostearate, sorbitane monopalmitate, sorbitane monolaurate, sorbitane monooleate, sorbitane tristearate, and examples of such a protective colloid include polyvinyl alcohol, methyl cellulose, ethyl cellulose hydroxymethyl cellulose, hydroxyethyl cellulose, carboxymethyl cellulose, carboxyethyl cellulose, etc.

Removal of the dissolved oxygen in the system and treatment of the reaction product, etc. are the same as described above, and the reaction conditions are not limited, but are generally as follows: amount of solvent employed: equal to 20-fold of the aqueous monomer solution, preferably equal to 10-fold, particularly preferably equal to 5-fold; the amount of polymerization initiator employed: 0.0005 to 5 mole %, preferably 0.001 to 1 mole %, particularly preferably 0.005 to 0.5 mole %, based on the monomer component; a polymerization initiation temperature of about 10 to 90° C.; and a reaction time of about 1 to 10 hours.

The molecular structure of the thus obtained resin has a three-dimensional structure formed by crosslinking of straight chain polymers comprising a homopolymer of an N-vinylcarboxylic acid amide or a copolymer thereof with another copolymer component. Primarily, the molecular weight of the backbone chain and the crosslinking density will exert a strong control of the function of the liquid absorption agent. For example, although theoretically it is possible to make the liquid absorption ability greater by making the backbone chain as large as possible and the crosslinking density as small as possible, the liquid absorption ability itself is limited, and if the distance between crosslinks becomes larger, the physical strength of the gel formed by absorption of liquid is remarkably lowered, and further, the number of molecules not participating in the crosslinking is increased to give a higher solubility. Therefore, it is important that the polymerization degree of the backbone chain is from 500,000 to 100, preferably 400,000 to 1000, particularly preferably from 200,000 to 10,000, and that the crosslinking density is from 1/500,000 to 1/100, preferably from 1/300,000 to 1/1000, particularly preferably from 1/200,000 to 1/10,000.

In a preferred embodiment, the liquid absorbent resin can comprise, as a main component, a crosslinked N-vinylcarboxylic acid amide resin, a crosslinked acrylic acid amide resin, or a crosslinked vinyl alcohol resin comprising the backbone chain of a homopolymer or copolymer comprising repeating units (a) or (a) and (b) of the formulas shown below crosslinked with a crosslinking agent:

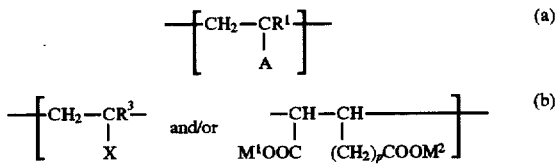

wherein $R^1$ and $R^2$ independently represent a hydrogen atom or methyl; A represents —$NR^3$—CO—$R^4$ (wherein $R^3$ and $R^4$ represent a hydrogen atom or methyl), —$CONH_2$ or —OH; X represents a group —COOY, wherein Y represents a hydrogen atom, an alkali metal, $C_1$–$C_6$ alkyl, or lower alkyl substituted with a hydroxyl, dialkylamino or quaternary ammonium group; a group —CONHZ, wherein Z represents a hydrogen atom or lower alkyl substituted with a dialkylamino group, quaternary ammonium group, sulfonic acid or an alkali metal salt thereof; cyano, 2-ketopyrrolidinyl, lower alkoxy, lower acyl, lower acyloxy or lower alkyl substituted with sulfonic acid or an alkali metal salt thereof, with a proviso that when $R^2$ is methyl, X is not cyano, 2-ketopyrrolidinyl, lower alkoxy, lower acyl, lower acyloxyl and lower alkyl substituted with sulfonic acid or a salt thereof; with a proviso that when A is —$CONH_2$, X is not —$CONH_2$; $M^1$ and $M^2$ independently represent a hydrogen atom or an alkali metal; p represents 0 or 1; and the molar ratio of (a):(b) is 50 -100:50 - 0.

Preferably, the liquid absorbent resins are crosslinked homo- or co-polymers of N-vinylcarboxylic acid amide, acrylic acid amide, vinyl alcohol or combinations thereof. More preferably, the liquid absorbent resins are crosslinked homo- or co-polymers of N-vinylcarboxylic acid amide.

Typical examples of solvents to be absorbable by the absorbents used in the present invention are those organic solvents set forth below, which are generally called solvents having relatively high polarity:

Alcohols such as methanol, ethanol, 1-propanol, 1-butanol, 2-butanol, isobutyl alcohol, isoamyl alcohol, cyclopentanol, allyl alcohol, 1,1,1,3,3,3-hexafluoro-2-propanol, 2-methoxyethanol, 2ethoxyethanol, 2-butoxyethanol, 2-amino ethanol, ethylene glycol, trimethylene glycol, propylene glycol, 1,4-butanediol, 1,3-butanediol, 2,3butanediol, triethylene glycol, and glycerol; phenols such as phenol and cresol; formamide, acetic acid, 2pyrolidinene, dimethyl sulfoxide, pyridine, and the like. Furthermore, solvents which are not absorbable alone or are little absorbable alone but are absorbable upon mixing with other absorbable solvents can be used in mixed solvent form. Typical examples of mixed absorbable solvents are as follows: mixtures of water and organic solvents such as water and N,N-dimethylformamide, phenol, acetone, tetrahydrofuran or dioxane; and mixtures of organic solvents such as ethanol-acetone, ethanol-chloroform, ethanol-benzene, ethanol-ethyl acetate, methanol-methylene chloride, and ethyl acetate-acetic acid.

The organo-metallic compounds or metallic salts to be used in the present invention are those that are soluble in water and/or organic solvents, or in acidic or alkaline solutions, as the case may be.

The organo-metallic compounds (metal-organic radicals) include compounds wherein the metal component is selected from titanium, zirconium, yttrium, aluminum, barium, hafnium, tin, copper and combinations thereof and the organic radical component is selected from alkoxy, aryloxy, aminoalkoxy, acetoxy, acetoacetonyl and combinations thereof. The organo-metallic compounds may include chelate compounds such as indium tris(acetylacetonate).

Suitable organo-metallic compounds for use in the present invention include $C_1$–$C_6$ alkoxides of titanium, zirconium, yttrium, aluminum, barium, and copper. Specific examples of other organo-metallic compounds which can be used in the present invention include ethyl trimethyl lead, dinitrosyl dicarbonyl iron, dimethyl aluminum hydride, and titanates such as tetraisopropyl orthotitanate and tetrabutyl orthotitanate.

The metallic salts (metal-anions) include salts wherein the metal component is selected from aluminum, strontium, yttrium, zirconium, barium, lead, samarium, rubidium, lanthanum, indium, copper, calcium, magnesium, bismuth, zinc, silicon, germanium, nickel, astatine, tantalum, vanadium, iron, chromium, cadmium, cesium, gallium, niobium, silver, selenium, tungsten, tellurium, thorium, palladium, arsenic, platinum, rhodium, ruthenium and combinations thereof and the anion component is selected from hydroxide, nitrate, sulfate, carbonate, phosphate, chlorate, halide, acetate and combinations thereof.

Suitable metallic salts for use in the present invention include chlorides, hydroxides, nitrates, sulfates, carbonates, phosphates, and chlorates of aluminum, strontium, yttrium, zirconium, barium, lead, samarium, rubidium, lanthanum, indium, bismuth and copper.

The salt to resin ratio (defined as the mass of the metallic salt to the mass of the dry resin) can have an effect on the present invention. Specifically, a low salt:resin ratio can be particularly useful for producing a fine powder suitable for ceramic devices. In this regard, the salt:resin ratio is preferably 1:1 or less, more preferably 0.5:1 or less. On the other hand, a high salt:resin ratio can be particularly useful for producing a porous crystalline material which has a microstructure (porosity, surface area, pore size, etc.) significantly different from other porous crystalline oxides and which has significant commercial potential for use in catalyst supports, gas filters, membranes, adsorbents, and environmental cleanup applications. In this regard, the salt:resin ratio is preferably at least 5:1, more preferably at least 15:1.

An embodiment of the present invention can have solutions combined in ways including the following:

(1) organic solvent solution containing metal (a) compound+organic solvent solution containing metal (b) compound;

(2) organic solvent solution containing metal (a) compound+aqueous solution containing metal (b) compound;

(3) aqueous solution containing metal (a) compound+aqueous solution containing metal (b) compound (Metals (a) and (b) are different metal species.)

The swelling time in the present invention can be preferably from about 1 to about 48 hours, more preferably from about 1 to about 24 hours, to form a swollen gel. The exact swelling time will vary depending on the type of gel used and the type of powder being produced. Thus, the swelling time in the present invention can be preferably from about 10 to about 25 hours, more preferably from about 15 to about 25 hours, most preferably from about 20 to about 25 hours, to form a swollen gel.

The swollen gel is used to prepare a precursor material. In particular, the precursor material can be prepared by changing the pH and/or temperature of the swollen gel. The pH change is dependent on the particular system and can be determined by routine optimization. Specific pH ranges for precipitation will vary depending on the type of gel used and the powder being produced. The temperature is preferably changed from room temperature to at least 100° C. until dry, more preferably from room temperature to at least 1500° C. until dry, most preferably from room temperature to at least 2500° C. until dry. Specific temperature ranges for precipitation will vary depending on the type of gel used and the powder being produced.

The precursor material is then subjected to pyrolysis and calcination to form a mixed metal oxide powder. Specifically, the precursor material (consisting of dry gel and precipitate) is subjected to pyrolysis (the removal of the gel from the precursor material by burning) and calcination (the formation of the final crystalline powder). In the case of producing a porous crystalline material, the precursor should not be milled before being subjected to pyrolysis and calcination.

The pyrolysis is preferably conducted at a temperature of from 100° to 400° C. The exact temperature of pyrolysis will vary depending on the type of gel used and the type of powder being produced.

The precursor material is raised to the calcination temperature (and to or through the pyrolysis temperature) at a rate of temperature change of preferably from 0.1° to 10° C./min. The exact rate of temperature change will vary depending on the type of gel used and the type of powder being produced.

The calcination is preferably conducted for a period of time of from 0.1 to 24 hours. The exact calcination time will vary depending on the type of gel used and the type of powder being produced.

After calcination the temperature is lowered at a rate of temperature change of preferably from 0.1° to 10° C./min. The exact rate of temperature change will vary depending on the type of gel used and the type of powder being produced.

The optimal pyrolysis and calcination schedule can be determined for each individual system by routine optimization. In a best case scenario, the calcination temperature is the temperature of pyrolysis (e.g., ~300° C.).

It should be noted that the present invention is directed to a method for the synthesis of mixed metal oxide powders and thus should be distinguished from a method for the synthesis of single metal oxide powders such as that disclosed in Application Example 2 of EP 0 473 881 A1. In particular, a multi-component metal system is applicable to the present invention, while such is not applicable to the method in Application Example 2 of the European publication. To the extent of the solubility and concentration of metal compounds, plural metal components can be mixed at an optional proportion or ratio, while such is not set forth in the European publication. It is noted that an organic solvent solution or a combination thereof with water can be used in the present invention, and such is not set forth in the European publication. Also, organo-metallic compounds or a combination thereof with a metal salt can be used, while such is not set forth in the European publication. In a solution of the metal compounds, the partitioning of the solution is possible using an organic gel network, and mixed metal oxide powders having chemical homogeneity and an ultrafine particle size can be produced as a result; such is not set forth in the European publication. In a dispersion of the metal compounds, the partitioning of the dispersion is possible using the organic gel network (such a partitioning can be called a "microdispersion"), and it is therefore possible to obtain mixed metal oxide powders having an ultrafine particle size and chemical homogeneity; such is not set forth in the European publication.

Examples of mixed metal oxides which can be produced by the present invention include strontium titanate, yttria-stabilized tetragonal zirconia polycrystalline powder (Y-TZP), indium tin oxide, barium zirconate, barium ferrite, rare earth metal zironates (e.g., lanthanum zirconate, cerium zirconate, gadolinium zirconate, and europium zirconate), and high temperature ceramic superconductors such as yttrium barium copper oxide superconductors.

Thus, the present invention can be used to make multi-component oxide ceramic powders useful for current industrial electronics applications such as capacitors, filters, oxygen sensors, and piezoelectric transducers, as well as for the large future market involving high temperature superconducting ceramics. For example, due to its superior dielectric properties, strontium titanate is an important material for the production of multi-layer capacitors and sensors.

In addition to electronics applications, some multicomponent oxide ceramic powders made by the present invention are useful in structural applications. For example, yttria-stabilized tetragonal zirconia polycrystalline powder (Y-TZP) is an important structural material due to its high strength and toughness. This material also displays superplastic behavior at high temperature which may enable the formation of very intricately shaped Y-TZP components.

Further, the porous crystalline material formed in certain embodiments of the present invention has significant commercial potential for use in, for example, catalyst supports, gas filters, membranes, adsorbents, and environmental cleanup applications.

The present invention will now be further illustrated by, but is by no means limited to, the following Examples. All parts, percents, ratios and the like are by weight unless otherwise indicated.

EXAMPLES

EXAMPLE #1

Synthesis of Mixed Metal Oxide Ultrafine Powder Through the Utilization of Liquid Absorption Resin, Salt, and an Alkoxide: Strontium Titanate Synthesis of Mixed Metal Oxide Powder Titanium isopropoxide was dissolved in isopropanol in a ratio of 0.15 g titanium isopropoxide to 1 g isopropanol (0.12 g titanium isopropoxide to 1 ml isopropanol). An amount of liquid absorption resin (in this example, the liquid absorption resin was made from N-vinylacetamide and had a maximum swelling ratio of approximately 50 grams of water to 1 gram of liquid absorption resin) was weighed out in a ratio of 0.75 g liquid absorbent resin to 1 g titanium isopropoxide. A third of the liquid absorption resin was combined with half of the titanium isoproproxide/isopropanol solution and stirred until well mixed (approximately 1 minute). Then, another third of the liquid absorption resin and the remaining solution was added and stirred. Finally, the remaining liquid absorption resin was added and stirred until well mixed.

The mixture was continuously stirred until it was completely gelled and a first swollen gel was formed.

The first swollen gel was placed in an oven at 100° C. until dry, thereby forming a dried gel as a first precursor material. Then, the dried gel was broken up with a pestle, such that the dried pieces of gel were no larger than a few centimeters at this point.

Strontium nitrate (an amount equal to the amount of liquid absorption resin weighed above) was dissolved in water in a ratio of 1 g strontium nitrate to 10 g water. The strontium nitrate solution was poured over the first precursor material.

Then, the first precursor material was allowed to swell and gel and thereby form a second swollen gel.

The second swollen gel was placed in an oven at 250° C. until dry, thereby forming a dried gel as a second precursor material.

The second precursor material was placed in a tube furnace with flowing air. The temperature of the furnace was raised to 950° C. at a rate of 10° C. per minute (the gel pyrolyzed at approximately 360° C.; see FIG. 1), and the temperature was held at 950° C. for 1 hour. Then, the temperature was decreased at 10° C. per minute. Subsequently, a powder (strontium titanate) was removed from the tube furnace.

Results of Powder Characterization

Figure 2:
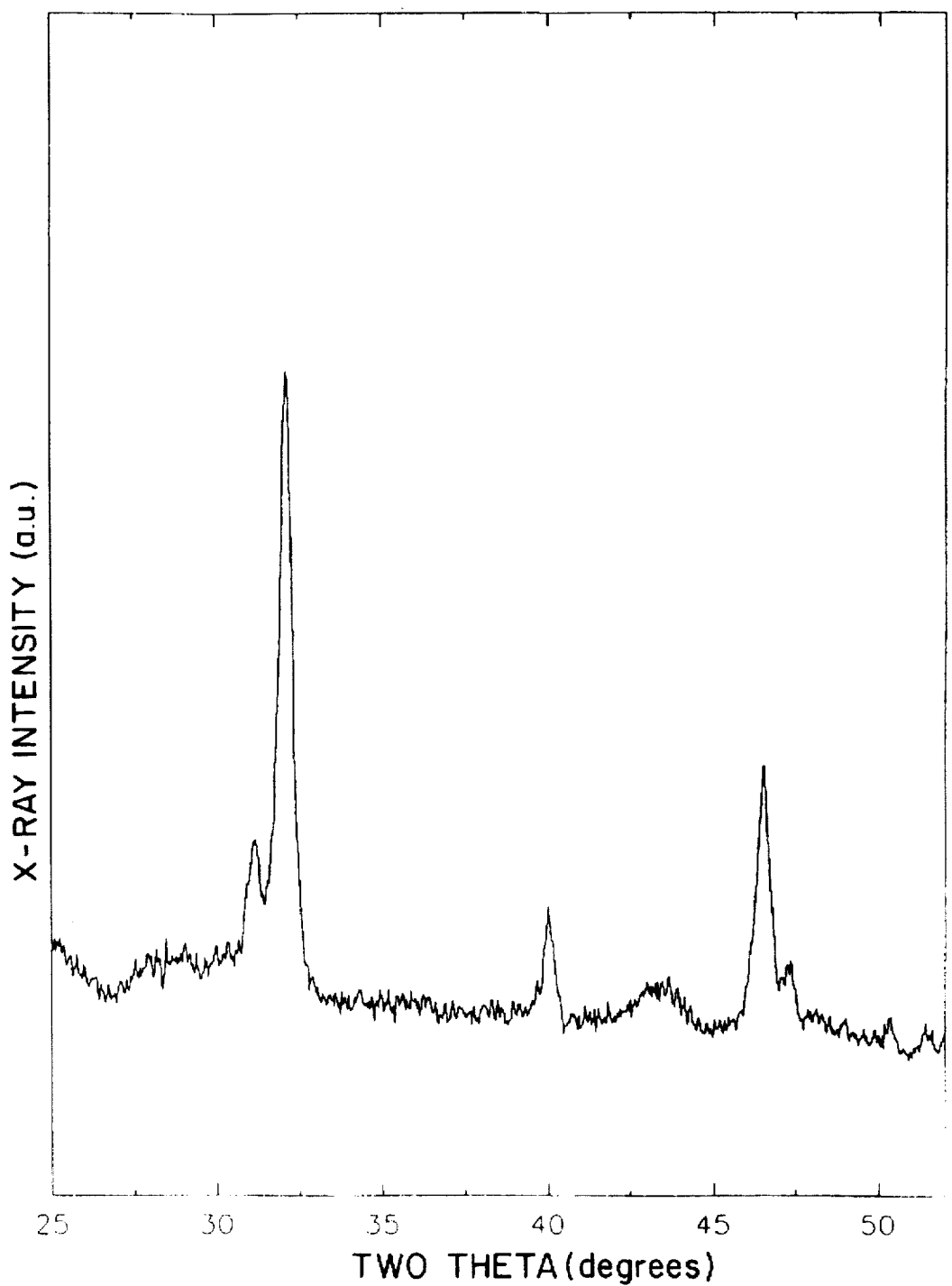
FIG. 2 shows the X-ray diffraction pattern from strontium titanate powder produced from the pyrolysis and calcination of a gel-titanium isopropoxide-strontium nitrate precursor to 950° C.

1) X-ray diffraction (XRD) analysis showed that after constant rate heating a small (approximately 30 mg) portion of the dry precursor to 950° C. (with no hold time at temperature), the resulting powder was primarily strontium titanate (see FIG. 2). Analysis of the diffraction peak widths indicated that the crystallite size of the powder was approximately 50 nm.

Figure 3:
FIG. 3 shows a scanning electron microscope micrograph of strontium titanate powder produced from the pyrolysis and calcination of a gel-titanium isopropoxide-strontium nitrate precursor to 950° C.

2) Scanning electron microscopy showed that the powder consisted of agglomerates with features on the order of 50 nm consistent with the XRD analysis (see FIG. 3).

EXAMPLE #2

Synthesis of Multi-Component Ultrafine Powder Through the Utilization of Liquid Absorption Resin and Two Salts: Yttria-Stabilized Tetragonal Zirconia Polycrystalline (Y-TZP) Powder Synthesis of Mixed Metal Oxide Powder Zirconium sulfate tetrahydrate and yttrium sulfate octahydrate were dissolved in water in the proportions 377 g water to 18.84 g zirconium sulfate tetrahydrate to 1 g yttrium sulfate octahydrate. An amount of liquid absorption resin (in this example, the liquid absorption resin was made from N-vinylacetamide and had a maximum swelling ratio of approximately 50 grams of water to 1 gram of liquid absorption resin) was weighed out to be 10 times less than the weight of the water used above. A third of the liquid absorption resin was combined with half of the solution and stirred until well mixed (approximately 1 minute). Then, another third of the liquid absorption resin and the remaining solution was added and stirred. Finally, the remaining liquid absorption resin was added and stirred until well mixed.

The liquid absorption resin was allowed to swell and gel for 24 hours to form a swollen gel.

The swollen gel was placed in an oven at 250° C. until dry, thereby forming a dried gel as a precursor material.

The precursor material was placed in a tube furnace with flowing air. The temperature of the furnace was raised to 700° C. at a rate of 10° C. per minute (the gel pyrolyzed at approximately 360° C.), and the temperature was held at 700° C. for 1 hour. Then, the temperature was decreased at 10° C. per minute. Subsequently, a powder (Y-TZP) was removed from tube furnace.

Results of Powder Characterization

Figure 4:
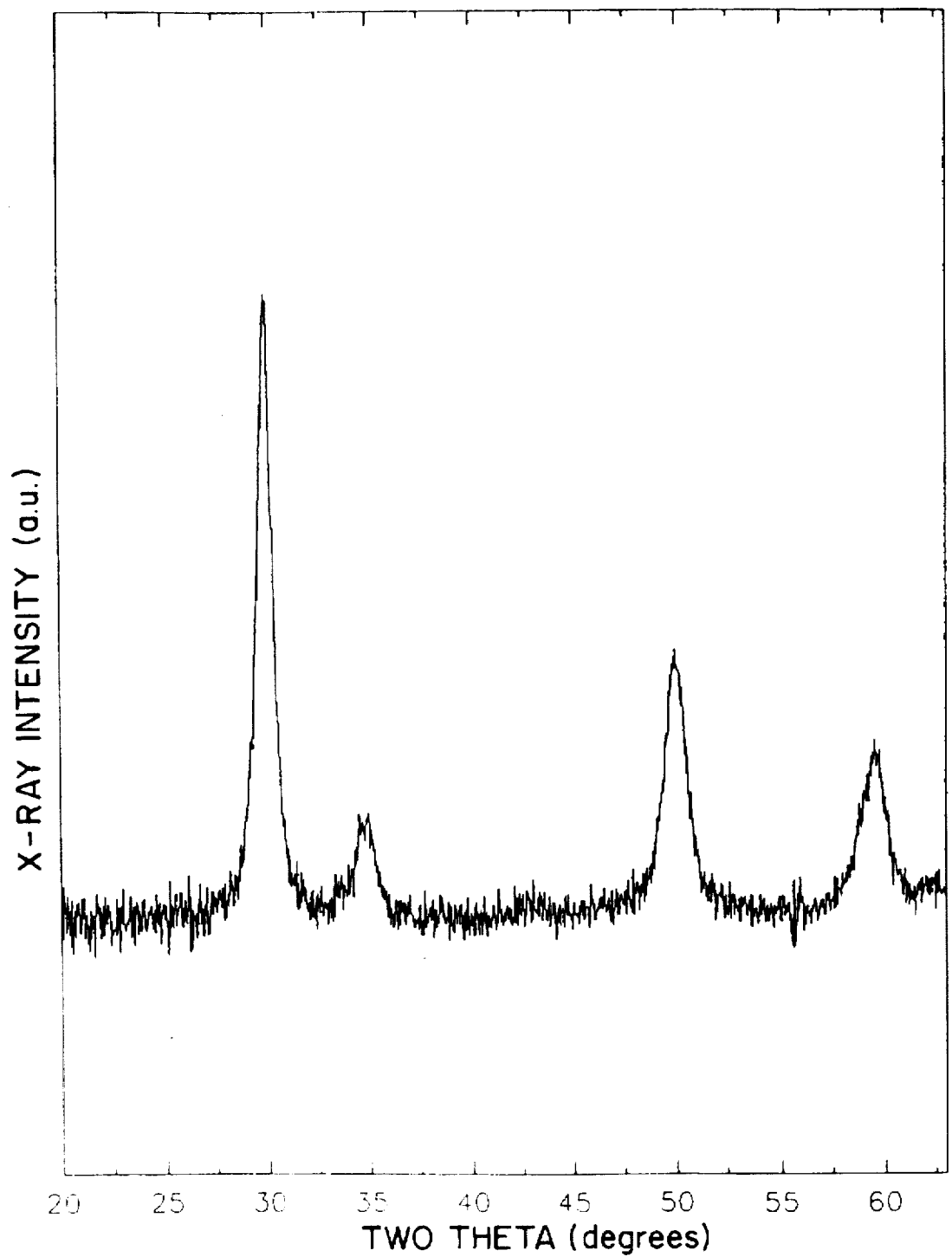
FIG. 4 shows the X-ray diffraction pattern from Y-TZP powder produced from the pyrolysis and calcination of a gel-zirconium sulfate-yttrium sulfate precursor to 700° C.

1) X-ray diffraction (XRD) analysis showed that the powder after calcination at 700° C. was pure Y-TZP with no monoclinic or cubic phases evident (see FIG. 4). Analysis of the diffraction peak widths indicated that the crystallite size of the powder was approximately 10 nm.

Figure 5:
FIG. 5 shows a scanning electron microscope micrograph of Y-TZP powder produced from the pyrolysis and calcination of a gel-zirconium sulfate-yttrium sulfate precursor.

2) Scanning electron microscopy showed that the powder formed approximately 20 μm agglomerates but that the microstructure had an ultrafine morphology with features on the order of 50 nm (see FIG. 5).

EXAMPLES #3–5

Synthesis of Multi-Component Powder Through the Utilization of Various Liquid Absorption Resins and Two Salts: Indium Tin Oxide Resin for Example #3: N-vinylacetamide Resin (PNVA-1)

To a glass reaction vessel, 750 g of water was added, then 200 g of N-vinylacetamide and 32 mg of N,N'-diacetyl-N,N'-divinyl-1,4-bisaminomethylcyclohexane as a crosslinking agent were added to the vessel and dissolved in the water. The oxygen dissolved in the resulting solution was removed in advance by purging with nitrogen gas, and thereafter a solution of 0.4 g of 2,2'-azobis (2amidinopropane)dihydrochloride as a polymerization initiator in 49.6 g of water was added. The reaction was performed for 16 hours in a thermostatic water bath maintained at 30° C. in a nitrogen gas stream. The resulting gel-like reaction product was finely ground and dried at 105° C. for 24 hours. The dried product was finely pulverized and classified into a product of 48 to 100 mesh.

Resin for Example #4: Acrylic Acid Amide Resin (PAM-1)

The same procedures used to prepare the resin for Example #3 (PNVA-1) were repeated except that a mixture of 200 g of acrylamide was used as a monomer component and 43 mg of N,N'-methylenebisacrylamide was used as the crosslinking agent to give a resin.

Resin for Example #5: Vinyl Alcohol Resin (PVA-1)

AQUARESERVE GP-48 (trademark for a product made by the Nippon Synthetic Chemical Industry Co., Ltd.) was used as the resin for this example.

Synthesis of Mixed Metal Oxide Powders for Examples #3–5

0.225 g of tin chloride ($SnCl_4 \cdot nH_2O$) was completely dissolved in 100 ml of purified water (0.225 wt %, 0.01 mol/l). 3.548 g of indium nitrate ($In(NO_3) \cdot nH_2O$) was added and dissolved in the solution (3.42 wt %, 0.1 mol/l). Then, 10 g of liquid absorbent resin (PNVA-1 for Example #3, PAM-1 for Example #4 and PVA-1 for Example #5) was added to the solution.

The liquid absorbent resin was allowed to swell and gel for 24 hours to form a swollen gel.

The swollen gel was placed in an oven (under atmospheric pressure, +5° C./min, 250° C. for 1 hour) until dry, thereby forming a precursor material.

The precursor material was pyrolyzed and then calcined (under atmospheric pressure, +10° C./min, 550° C. for 1 hour) to form indium tin oxide (ITO) powder.

Results of Synthesis for Examples #3–5

Scanning electron microscope micrographs at different degrees of magnification for the ITO powder produced by using PVNA-1 in Example #3 are shown in FIGS. 6A and 6B.

Scanning electron microscope micrographs at different degrees of magnification for the ITO powder produced by using PAM-1 in Example #4 are shown in FIGS. 7A and 7B.

Figure 8A:
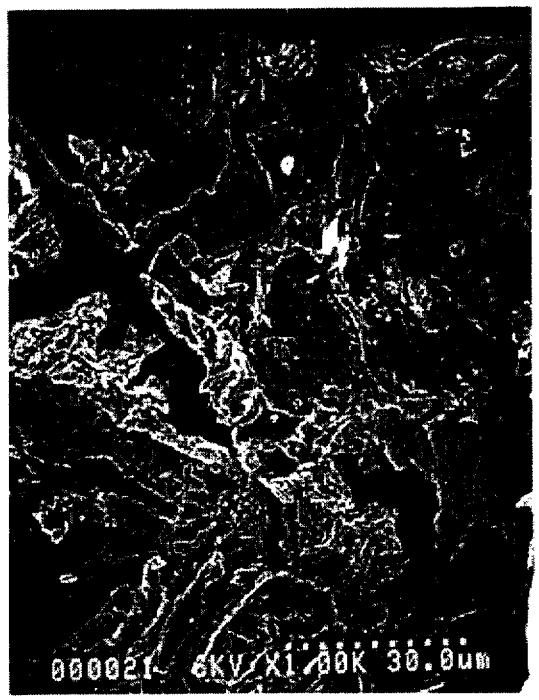
FIGS. 8A and 8B show scanning electron microscope micrographs at different degrees of magnification for indium tin oxide powder produced by using a vinyl alcohol resin.
Figure 8B:

Scanning electron microscope micrographs at different degrees of magnification for the ITO powder produced by using PVA-1 in Example #5 are shown in FIGS. 8A and 8B.

EXAMPLE #6

Synthesis of Yttria-Stabilized Tetragonal Zirconia Polycrystalline (Y-TZP) Powder under Various Conditions This set of experiments was directed to optimizing the powder properties and improving the cost effectiveness of Y-TZP snythesized according to the present invention. Different Y-TZP powders were synthesized by varying the processing parameters of the method. These powders, as well as precursors of the powders, were subsequently characterized through thermogravimetric analysis (TGA), X-ray diffraction (XRD), scanning electron microscopy (SEM), and sedimentation type particle size analysis in order to determine the effects of the various process parameters on the quality of the final product.

In the particular embodiment of the present invention used in this case, an aqueous solution of metal salts was prepared in a beaker. Dry resin was then added to the salt solution and allowed to swell and gel, thereby forming a swollen gel. After a completely swollen gel was formed, the beaker was placed in an oven to dry. This step created a precipitate-laden dry gel precursor. Following drying, the powder precursor was removed from the beaker and placed in a tube furnace with flowing air for pyrolysis and calcination.

A summary of the experiments is set forth in the tables below. The experiments are discussed in greater detail in the text following the tables.

Summary of Experiments on Y-TZP

| Salt to Gel Ratio | Water to Gel Ratio | Drying/Pre-Milling | Analysis After Drying | Pyrolysis/Calcination | Analysis After Calcination |
|---|---|---|---|---|---|
| 5:1 | 20:1 | dried at 250 C precursor milled | TGA | to 700 C @ 10 C/min. held one hour | particles size analysis |
| 5:1 | 20:1 | dried at 250 C precursor milled | TGA | to 800 C @ 10 C/min. held one hour | XRD SEM particle size analsis |
| 5:1 | 20:1 | dried at 250 C precursor milled | TGA | to 800 C @ 5 C/min. held one hour | SEM particle size analysis |
| 5:1 | 20:1 | dried at 250 C precursor milled | TGA | to 800 C @ 10 C/min. held 12 minutes | visual inspection |
| 5:1 | 7:1 | dried at 250 C precursor milled | TGA | to 700 C @ 10 C/min. held one hour | visual inspection |
| 5:1 | 7:1 | dried at 250 C precursor milled | TGA | to 800 C @ 10 C/min. held one hour | XRD particle size analysis |
| 5:1 | 7:1 | dried at 250 C precursor milled | TGA | to 800 C @ 5 C/min. held one hour | particle size analysis |
| no gel | no gel | dried at 250 C precursor milled | TGA | to 800 C @ 10 C/min. held one hour | XRD particle size analysis |
| 15:1 | 20:1 | dried at 250 C precursor milled | TGA | to 700 C @ 10 C/min. held one hour | visual inspection |
| 15:1 | 20:1 | dried at 250 C precursor milled | TGA | to 800 C @ 10 C/min. held one hour | XRD SEM particle size analysis |
| 15:1 | 20:1 | dried at 250 C | TGA top of beaker TGA mid beaker | | |
| 15:1 | 20:1 | dried at 250 C precursor milled | TGA | to 600 C @ 10 C/min. held one hour | XRD SEM |
| 15:1 | 20:1 | dried at 250 C precursor milled | TGA | to 700 C @ 10 C/min. held one hour | XRD SEM |
| 15:1 | 20:1 | dried at 250 C precursor milled | TGA | to 800 C @ 10 C/min. held one hour | XRD SEM |
| 0.5:1 | 10:1 | dried at 250 C | TGA top of beaker TGA mid beaker TGA bot. of beaker XRD after TGA | | |
| 0.5:1 | 10:1 | dried at 250 C precursor milled | TGA | to 500 C @ 10 C/min. held 30 minutes | XRD particle size analysis |
| 0.5:1 | 10:1 | dried at 250 C precursor milled | TGA | to 500 C @ 10 C/min. held three hours | XRD particle size analysis |
| 0.5:1 | 10:1 | dried at 250 C precursor milled | TGA | to 700 C @ 10 C/min. held one hour | particle size analysis |
| 0.5:1 | 10:1 | dried at 250 C precursor milled | TGA | to 800 C @ 10 C/min. held one hour | XRD SEM particle size analysis |
| 15:1 (NA-0101) | 20:1 | dried at 250 C | TGA | | |
| 15:1 (NA-0102) | 20:1 | dried at 250 C | TGA | | |
| 15:1 | 20:1 | dried at 250 C | | to 700 C @ 10 C/min. held one hour | XRD SEM |

-continued

Summary of Experiments on Y-TZP

| Salt to Gel Ratio | Water to Gel Ratio | Drying/Pre-Milling | Analysis After Drying | Pyrolysis/Calcination | Analysis After Calcination |
|---|---|---|---|---|---|
| 4:1 | 5:1 | dried at 250 C | | to 700 C @ 10 C/min. held one hour | particle size analysis BET measurements XRD SEM |
| 15:1 | 20:1 | dried at 250 C | TGA XRD SEM | to 700 C @ 10 C/min. held one hour | particle size analysis XRD SEM |
| 15:1 | 20:1 | dried at 250 C | TGA XRD SEM | to 700 C @ 10 C/min. held one hour | particle size analysis XRD SEM |
| 0.5:1 | 10:1 | dried at 250 C | TGA SEM | to 700 C @ 10 C/min. held one hour | particle size analysis XRD SEM particle size analysis BET measurements |
| no gel | no gel | dried at 250 C | TGA SEM | to 700 C @ 10 C/min. held one hour | XRD SEM |
| 5:1 | 20:1 | dried at 150 C | | to 700 C @ 10 C/min. held one hour | XRD |
| 10:1 | 20:1 | dried at 150 C | | to 700 C @ 10 C/min. held one hour | XRD |
| 15:1 | 20:1 | dried at 150 C | | to 700 C @ 10 C/min. held one hour | XRD SEM |
| 2:1 | 40:1 | dried at 150 C | | to 700 C @ 10 C/min. held one hour | visual inspection |
| 1:1 | 40:1 | dried at 150 C | | to 700 C @ 10 C/min. held one hour | visual inspection |
| 0.5:1 | 40:1 | dried at 150 C | | to 700 C @ 10 C/min. held one hour | visual inspection |
| 2:1 | 20:1 | dried at 150 C | | to 700 C @ 10 C/min. held one hour | XRD |
| 1:1 | 20:1 | dried at 150 C | | to 700 C @ 10 C/min. held one hour | XRD |
| 0.5:1 | 20:1 | dried at 150 C | | to 700 C @ 10 C/min. held one hour | XRD |
| 2:1 | 10:1 | dried at 150 C | | to 700 C @ 10 C/min. held one hour | XRD |
| 1:1 | 10:1 | dried at 150 C | | to 700 C @ 10 C/min. held one hour | XRD |
| 0.5:1 | 10:1 | dried at 150 C | | to 700 C @ 10 C/min. held one hour | XRD |

Figure 9A:
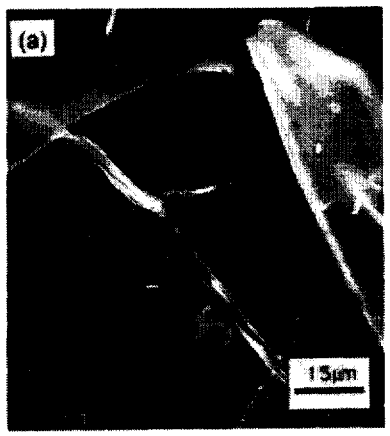
FIGS. 9A and 9B show SEM micrographs of precipitate laden dried precursor with salt to resin ratios of 0.5:1 and 15:1, respectively.
Figure 9B:
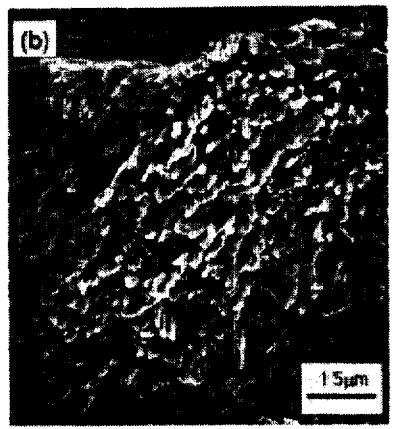
Figure 9C:
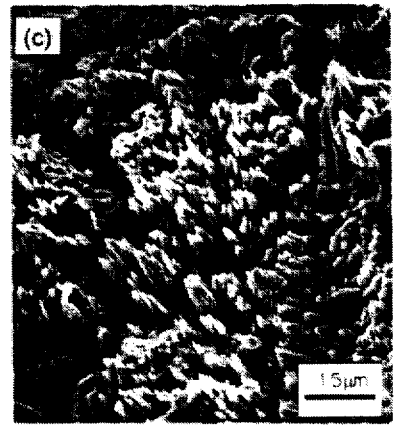
FIG. 9C shows a "no resin" sample.

In order for the invention technique to be particularly effective in producing fine powder, the precipitates in the gel after drying must be small and isolated. FIGS. 9A and 9B show SEM micrographs from the precipitate-laden dry precursor of samples prepared with salt to resin ratios of 0.5:1 and 15:1 (in the case of Y-TZP, the salt to resin ratio is defined as the mass of zirconium sulfate tetrahydrate to the mass of the dry resin). Also shown is an SEM micrograph of a Y-TZP precursor prepared without resin (FIG. 9C). The morphologies of the "no resin" and 15:1 precursor were very similar, both showing large precipitates. The morphology of the 0.5:1 sample was quite smooth, indicating a suppression of crystallite growth which was consistent with small and isolated precipitates.

Figure 10:
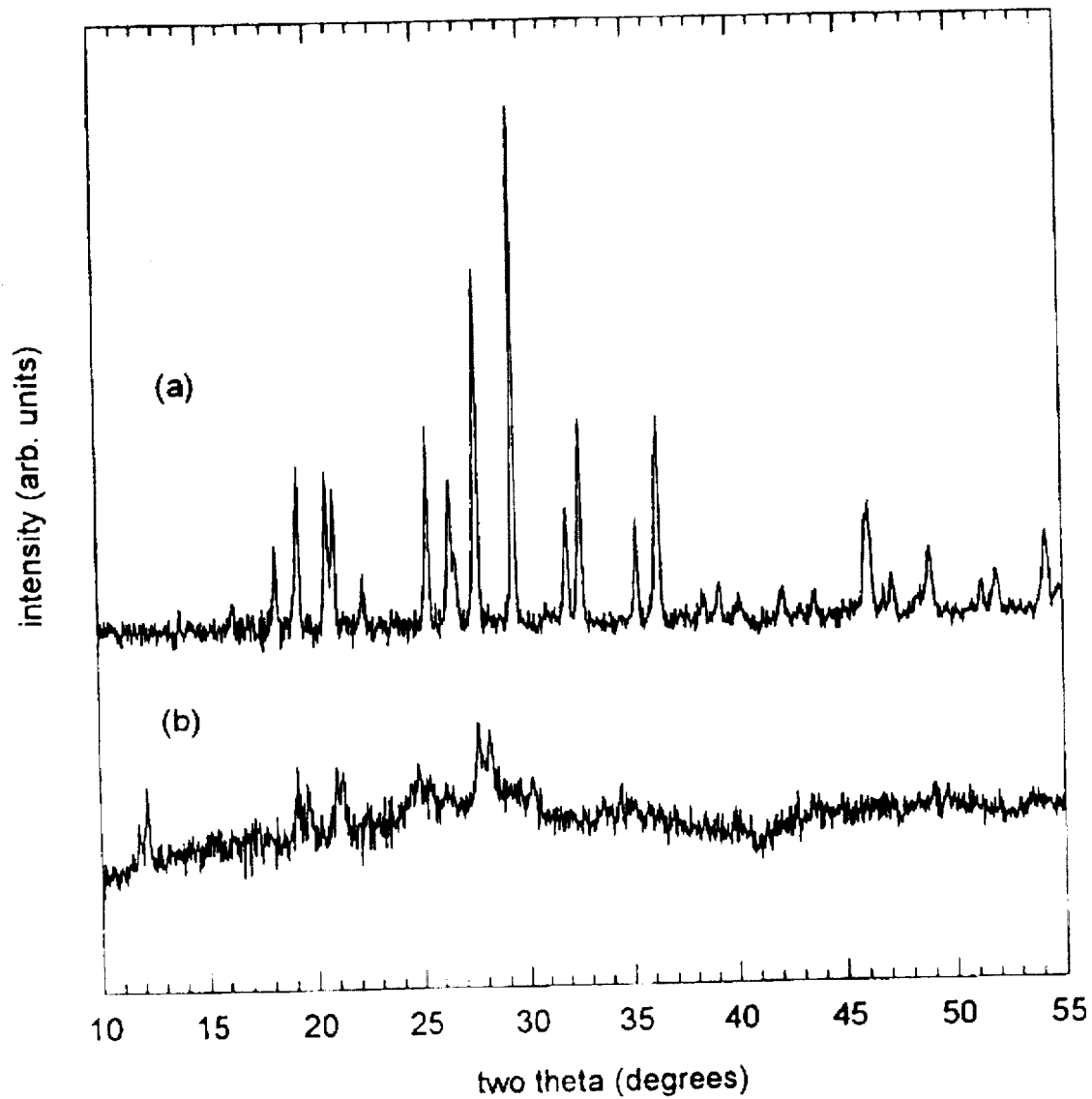
FIG. 10 shows XRD data from (a) the no resin sample and (b) the 15:1 sample after drying.

FIG. 10 shows XRD data from the 15:1 and "no resin" precursors. The XRD data from the "no resin" sample shows that the precipitates seen in FIG. 9C were primarily zirconium sulfate. However, the XRD data from the 15:1 precursor shows that while some crystallization occurred, the precipitates were mainly amorphous. The XRD analysis showed that while the morphologies of the 15:1 and "no resin" precursors were quite similar, the degree of crystallization was very different. FIGS. 9B and 10 show that even with a salt to resin ratio as high as 15:1, the gel affected the crystallization of the precipitate without significantly affecting its size.

As described above, the swollen gel was dried within the beaker used to mix the salt solution and the resin. In order to determine if this drying procedure led to homogeneous precipitation within the gel, TGA analysis was conducted on dried precursor taken from the top, the middle, and the bottom of the beaker.

Figure 11:
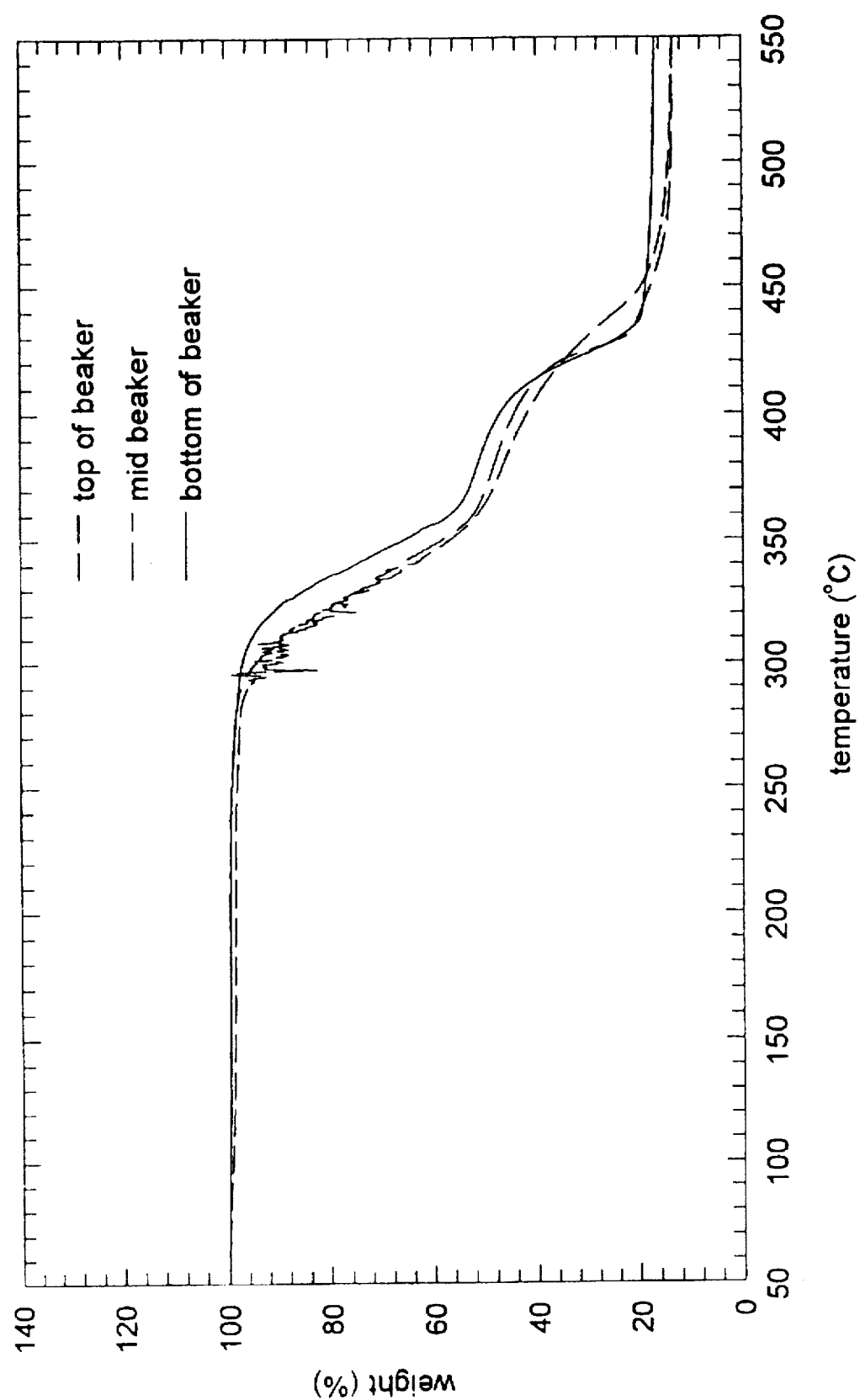
FIG. 11 shows TGA data from dried low yield precursor (0.5:1) taken from different parts of a beaker used in the experimentation.

FIG. 11 shows TGA data obtained from the 0.5:1 precursor. While the data differed for the precursor taken from different parts of the beaker, these variations were small. This indicates that the precipitation within the gel was indeed quite homogeneous on large length scales for the 0.5:1 precursor. In all three cases, the temperature of formation for Y-TZP was approximately 450° C. The percent weight remaining after heating to 550° C. was approximately 15% for all cases. The theoretical value for the percent weight remaining after complete conversion of the precursor to Y-TZP is 12%. The difference between the experimental weight loss after heating to 550° C. and the theoretical weight loss was due to residual carbon.

Figure 12:
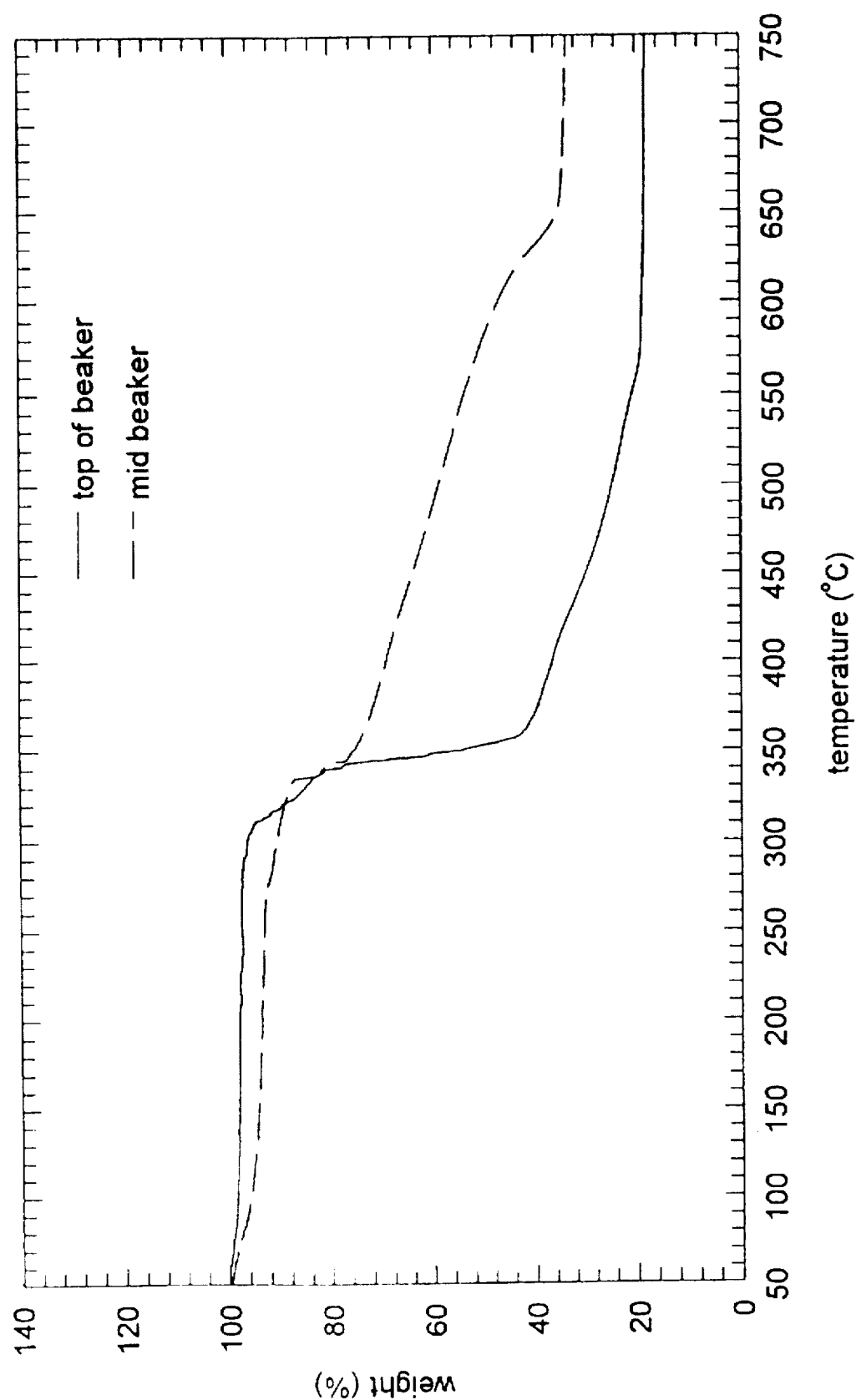
FIG. 12 shows TGA data from dried high yield precursor (15:1) taken from different parts of the beaker.

FIG. 12 shows TGA data obtained from the 15:1 precursor. These data showed that for high salt to resin ratios, the drying procedure described above did not lead to homogeneous precipitation. For precursor taken from the top and middle of the beaker, the weight loss profiles were significantly different.

As a remedial measure for this nonhomogeneous precipitation, the entire contents of the beakers used to dry the swollen gel were milled in a high speed grinder for approximately one minute prior to the TGA analysis. FIG.

Figure 13:
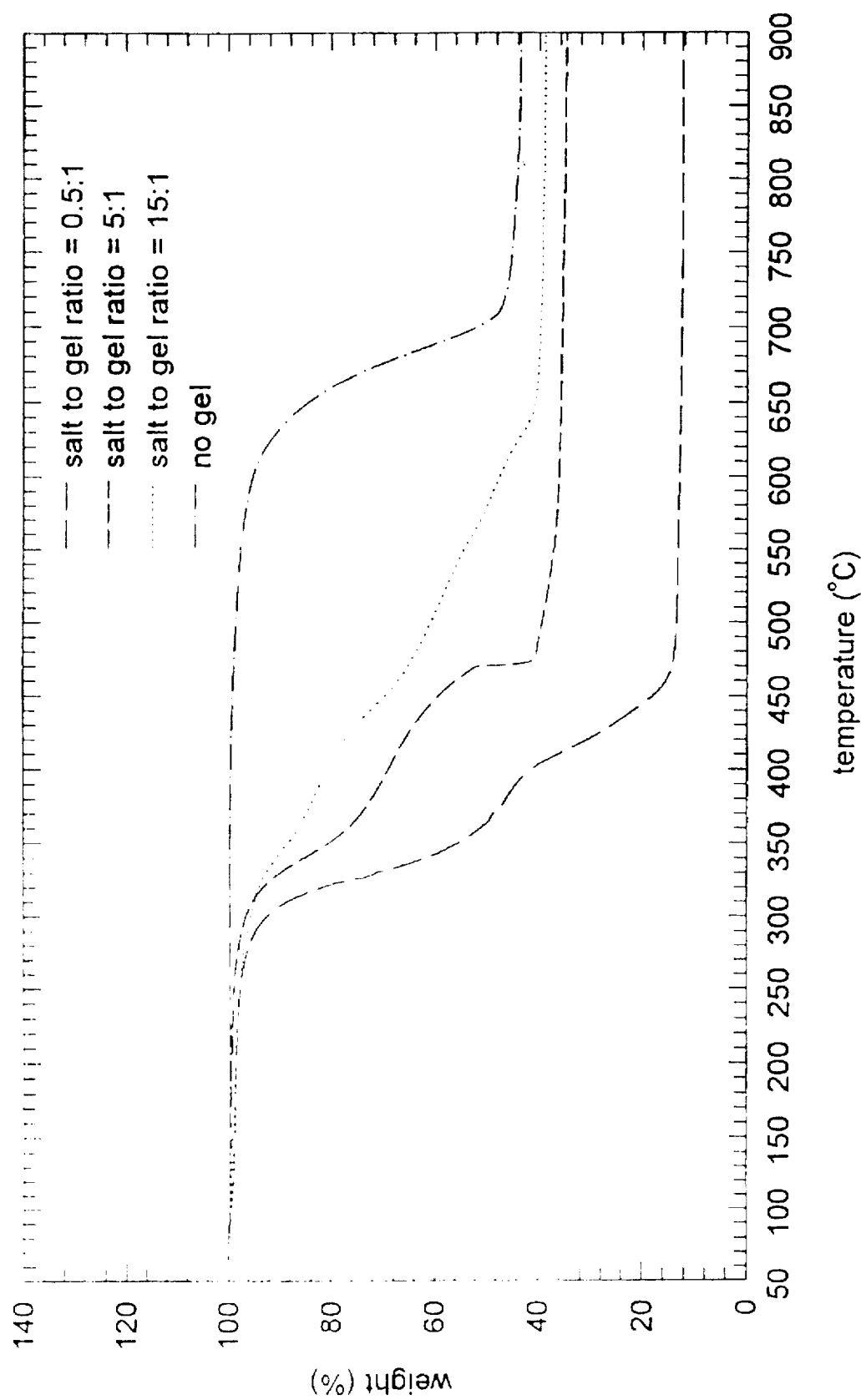
FIG. 13 shows TGA data from dried pre-milled precursor with salt to resin ratios of 0.5:1, and 15:1. Also shown is data from a sample prepared without resin.

13 shows TGA data obtained from milled precursors with salt to resin ratios of 0.5:1, 5:1, 15:1, as well as a sample prepared without resin. Following milling of the dried precursors, the TGA data for all the samples were very reproducible. FIG. 13 shows that the temperature of formation for Y-TZP produced with the invention technique increased as the salt to resin ratio increased. The temperature of formation for the 0.5:1 sample of 450° C. was consistent with the temperature of formation for sol-gel synthesized Y-TZP. This result indicated that at sufficiently low salt to resin ratios, the gel network was quite effective in partitioning small amounts of solution and in blocking solute from nucleation sites. This led to small precipitates with short diffusion paths and high diffusion coefficients which resulted in a low temperature of formation. The temperature of formation increased to 600° C., 650° C., and 700° C. for the 5:1, 15:1, and "no resin" samples, respectively.

Figure 14:
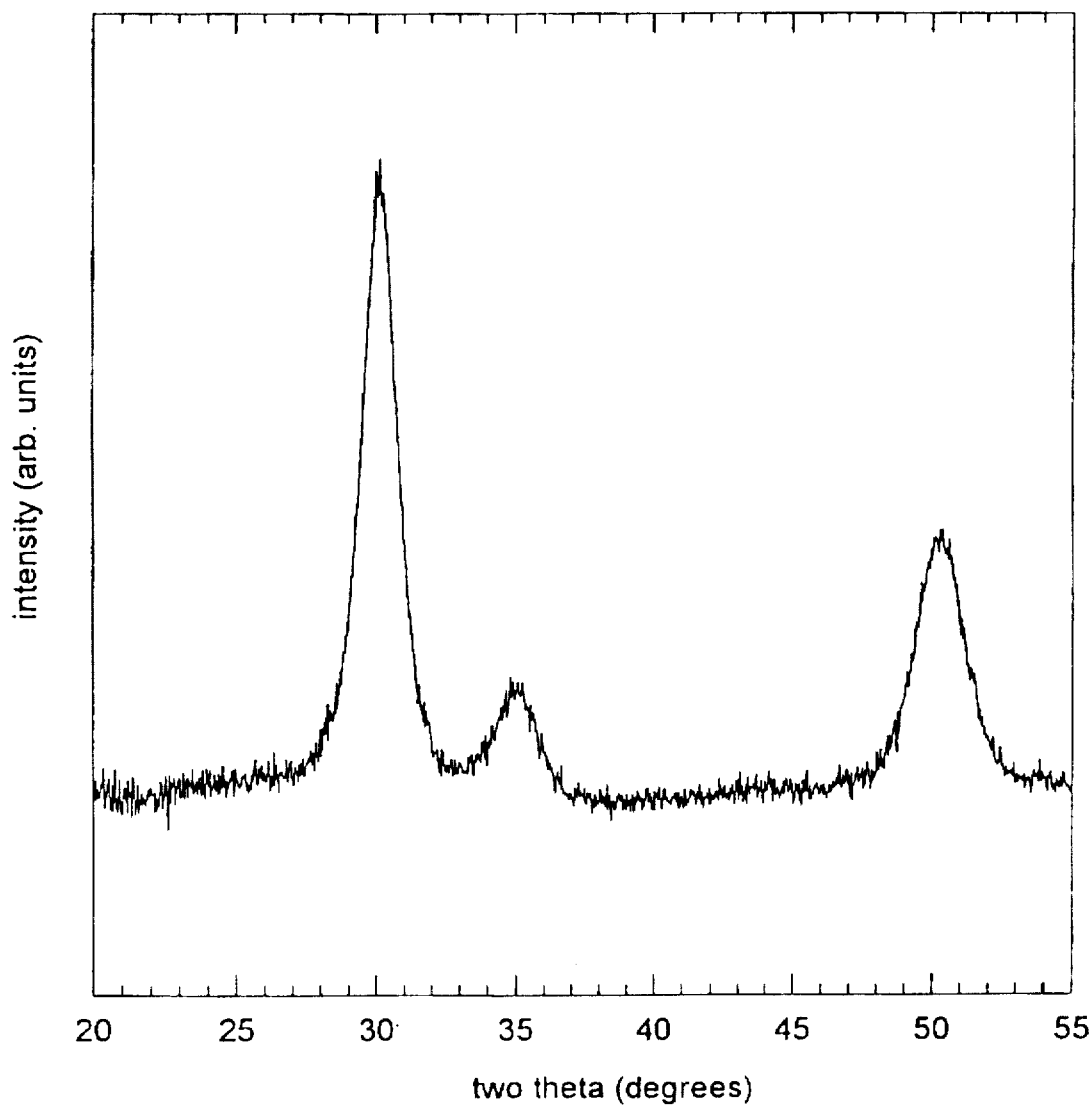
FIG. 14 shows XRD data from Y-TZP powder (0.5:1 precursor) calcined at 500° C. for three hours.
Figure 15:
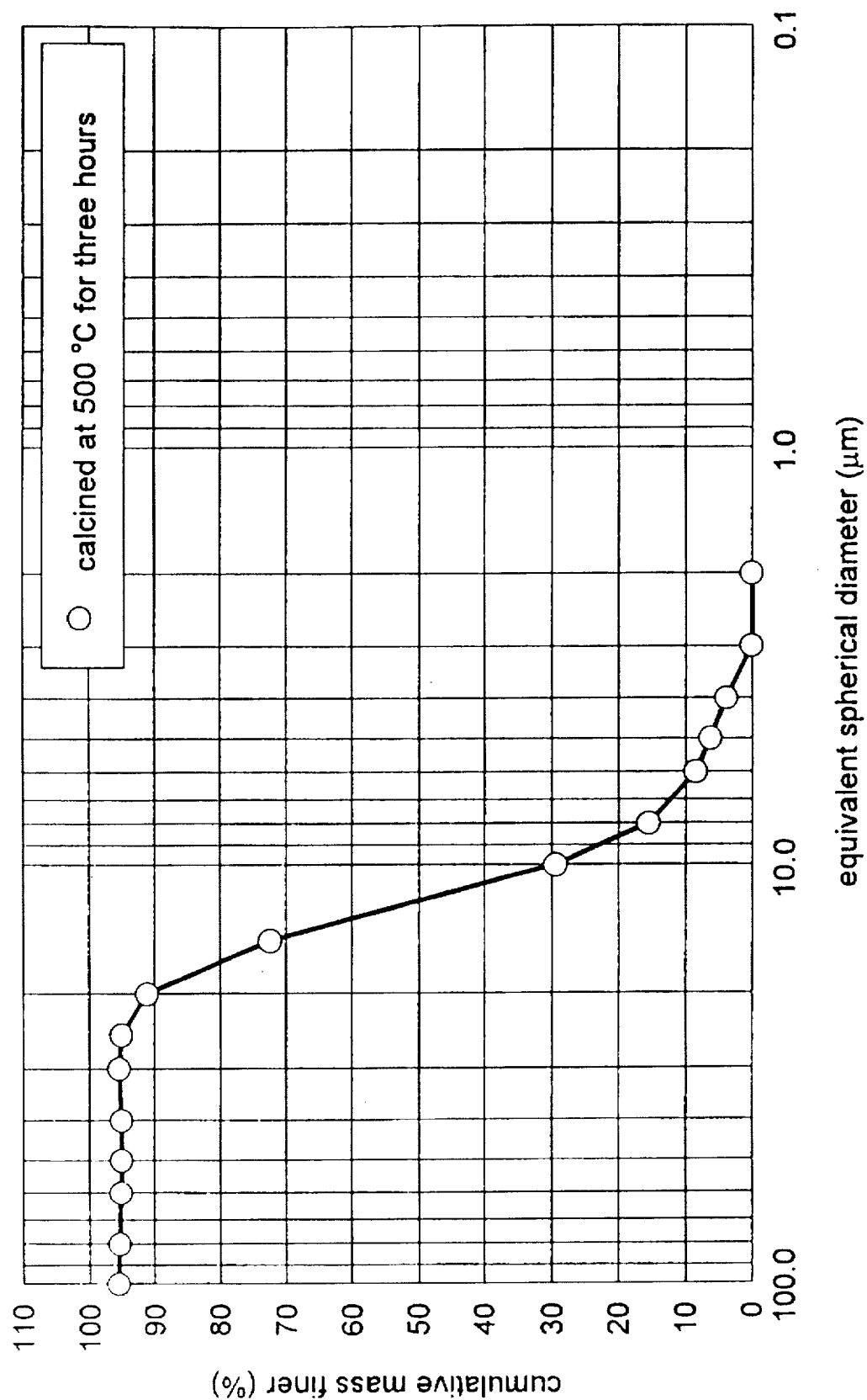
FIG. 15 shows the particle size distribution of ground zirconia powder from precursor with a salt to resin ratio of 0.5:1. The powder was calcined at 500° C. for three hours.

While the temperature of formation for the 0.5:1 sample was approximately 450° C., carbon burn-off was not complete until approximately 700° C. FIG. 14 shows XRD data from Y-TZP powder synthesized from 0.5:1 precursor. The precursor was pyrolyzed and calcined in a tube furnace with flowing air at a temperature of 500° C. for three hours. The XRD spectra is that of single phase Y-TZP powder with nanometer size crystallites, and the powder itself was a light brown and black color, indicating residual carbon. The particle size distribution of this ground powder which is shown in FIG. 15 was determined. 6.09 g/cm$^3$ was used as the density parameter (the density of 3 mol % Y-TZP) so that the effect of the residual carbon was not considered. Nevertheless, the large particle size indicated that a higher calcination temperature and more complete carbon burn off were required.

Figure 16:
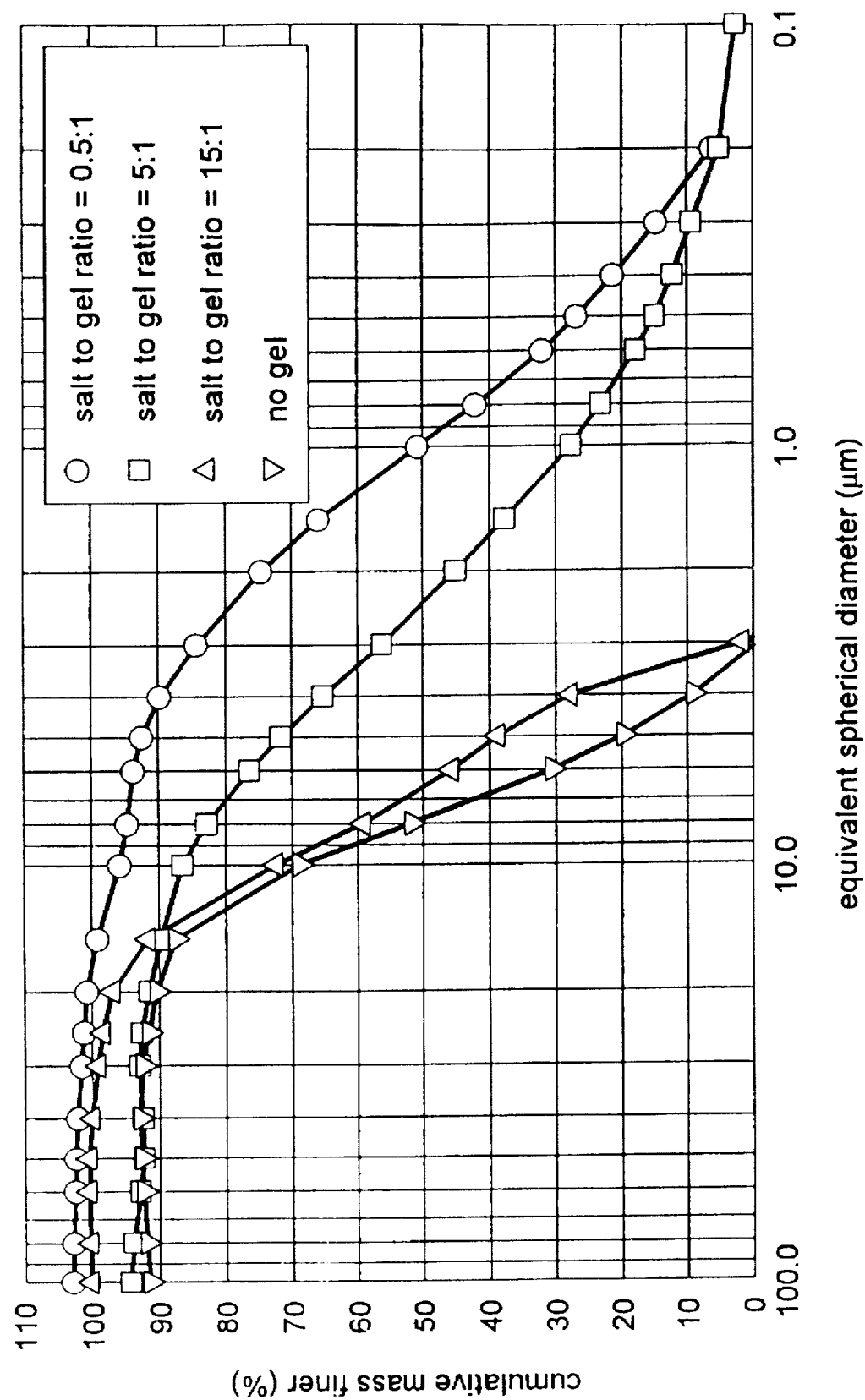
FIG. 16 shows particle size distributions of ground zirconia powders with salt to resin ratios of 0.5:1, 5:1, and 15:1. Also shown is data from a sample prepared without resin.

The assertion that the temperature of formation is correlated with particle size was experimentally demonstrated by comparing the particle size distributions of the powders derived from the precursors with salt to resin ratios of 0.5:1, 5:1, 15:1, as well as the "no resin" sample. FIG. 16 shows particle size distributions of milled zirconia powders synthesized from these precursors (all powders were milled in an identical fashion with mortar and pestle). The 0.5:1, 15:1, and "no resin" precursors were pyrolyzed and calcined in flowing air at 700° C. for one hour. The 5:1 precursor was pyrolyzed and calcined at 800° C. for one hour. The reason for the increase in calcination temperature for the 5:1 sample was that for intermediate salt to resin ratios, the residual carbon content was still very high even after heating to 700° C. (in fact, the powders were a deep brown color). FIG. 16 shows that large particle size was correlated with higher salt to resin ratio and therefore with a higher temperature of formation.

Figure 17:
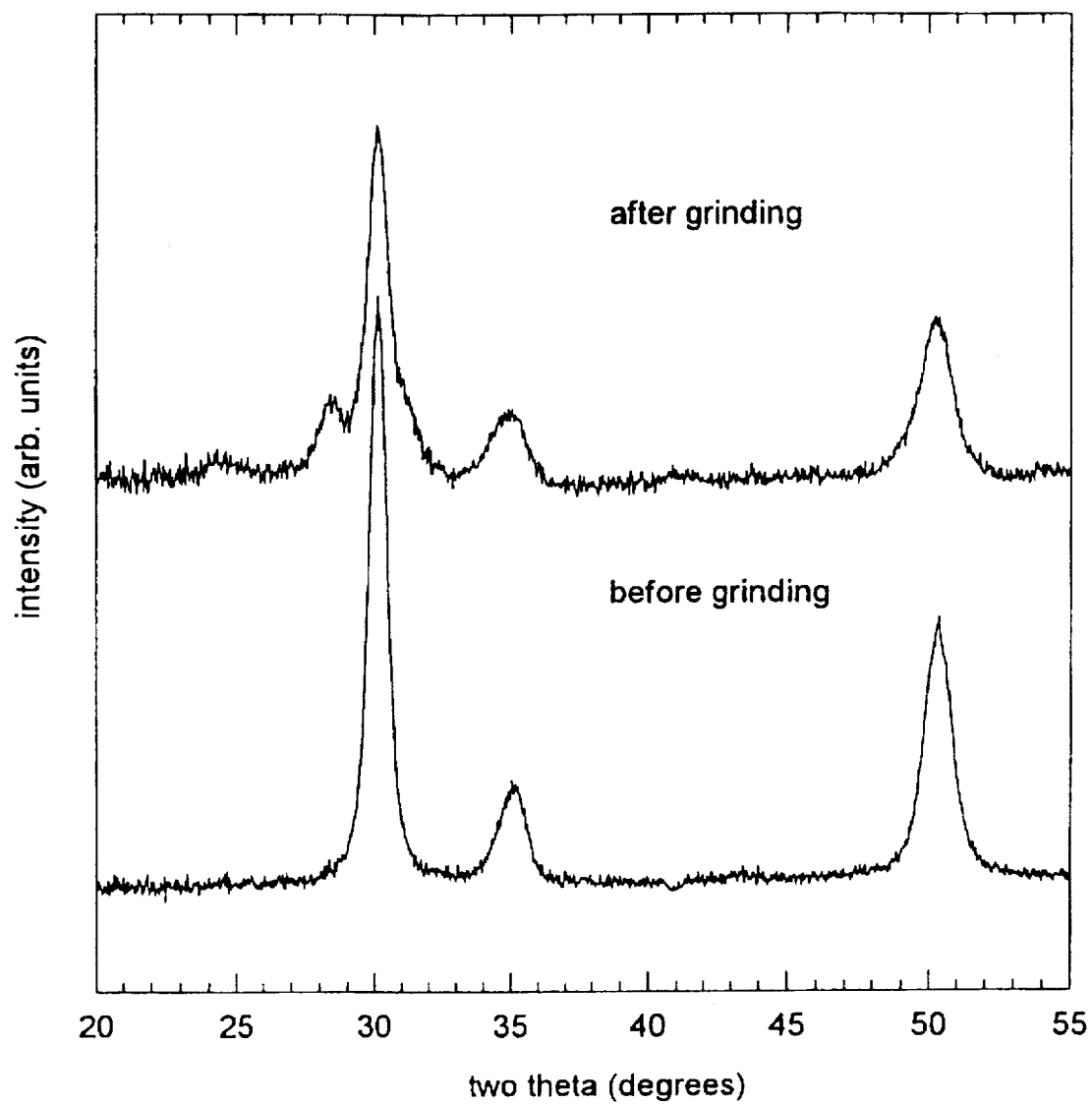
FIG. 17 shows XRD data from Y-TZP powder (5:1 precursor) before and after grinding.
Figure 18:
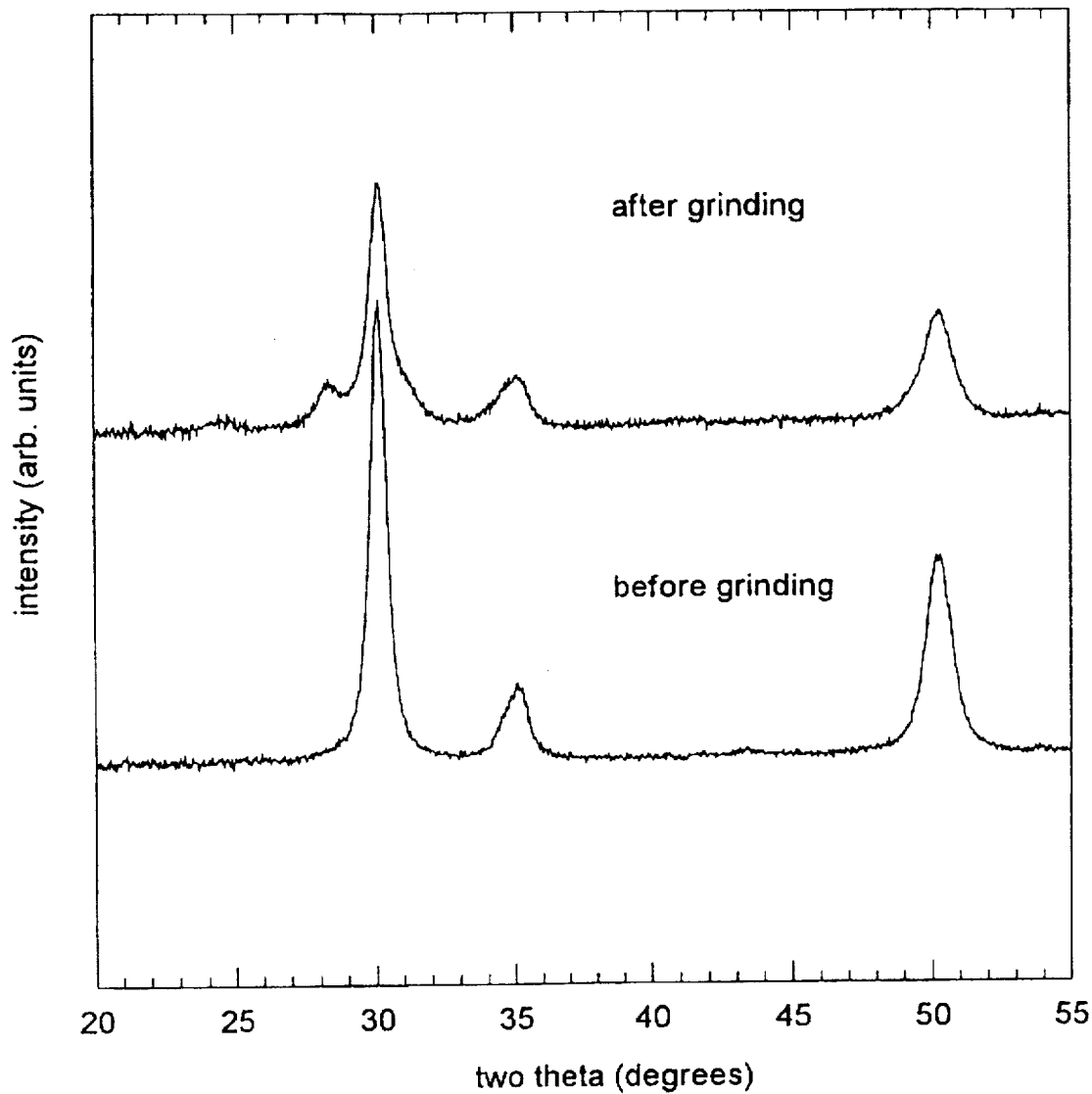
FIG. 18 shows XRD data from Y-TZP powder (0.5:1 precursor) before and after grinding.

It is important to note that the particle size distribution data are only semi-quantitative in nature. Reasons for this are that a spherical morphology is assumed and that particle porosity is not considered. Another reason the data had a qualitative aspect was that particle size determination by sedimentation requires, as an input parameter, the skeletal density of the powder. XRD analysis of these powders prior to grinding showed that they were pure Y-TZP (except the "no resin" powder, which was a combination of tetragonal and monoclinic phases). Since 3 mol % Y-TZP has a theoretical density of 6.09 g/cm$^3$, this value was used as the density parameter input (these powders were synthesized with the addition of yttrium sulfate octahydrate in the amount required to produce 3 mol % Y-TZP). However, subsequent XRD analysis of the ground powders showed that the grinding process itself led to partial stress induced transformation of the tetragonal phase to the monoclinic phase. FIG. 17 shows XRD spectra from the powder derived from the 5:1 precursor before and after grinding. FIG. 18 shows XRD spectra from the powder derived from the 0.5:1 precursor before and after grinding. The appearance of the monoclinic peaks (in addition to the tetragonal peaks) after grinding indicated partial stress-induced transformation. The fact that both the 0.5:1 sample and the 5:1 sample were partially transformed indicated that a lower salt to resin ratio did not increase stability.

Figure 19A:
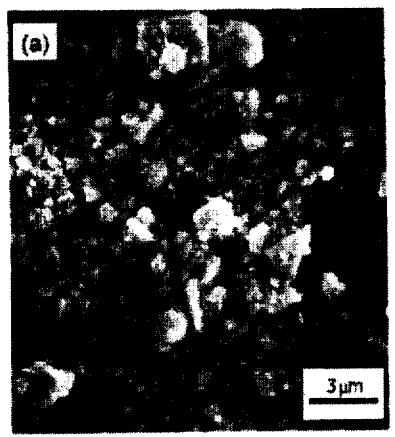
FIGS. 19A, 19B, and 19C show SEM micrographs of ground zirconia powders made from precursors with salt to resin ratios of 0.5:1, 5:1, and 15:1, respectively.
Figure 19B:
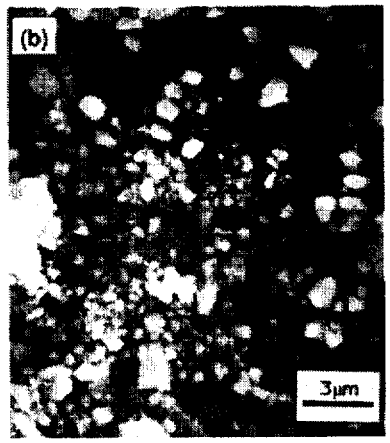
Figure 19C:
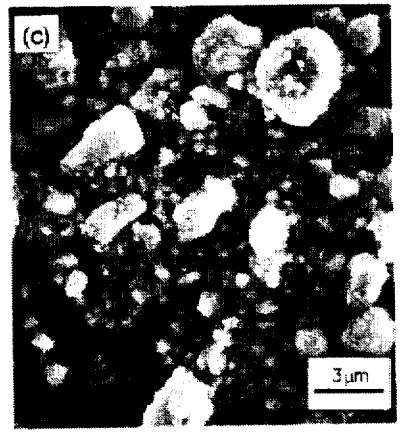

While the data shown in FIG. 16 are somewhat qualitative in nature, the difference in density between the tetragonal and monoclinic phases is relatively small so that the particle size analysis will still provide a useful estimate of the particle size distribution. SEM data supports this assertion. FIGS. 19A, 19B, and 19C show SEM micrographs from ground powders derived from milled precursors with salt to resin ratios of 0.5:1, 5:1, and 15:1. The increase in size with increase in salt to resin ratio was qualitatively apparent. While quantitative measurements based on the SEM micrographs were not undertaken, the data seemed to be in reasonable agreement with the sedimentation-type particle size analysis.

The rise in the temperature of formation with increasing salt to resin ratio may be understood by considering that the organic gel was ostensibly a non-rigid three-dimensional network of pores connected via small openings. By necessity, the sample with the salt to resin ratio of 15:1 was made by swelling the resin with a nearly saturated salt solution. Upon drying, precipitates formed very quickly while the network was still quite swollen and therefore very open. Since the network was relatively open when precipitation began, it had only limited effectiveness in blocking solute from the growing precipitate particles. In contrast, the sample with the salt to resin ratio of 0.5:1 was made by swelling the resin with a salt solution far from saturation. Upon drying, the gel underwent considerable collapse before precipitation began. In this case, the gel structure was relatively closed and was effective in blocking solute from the growing precipitate particles.

Figure 20:
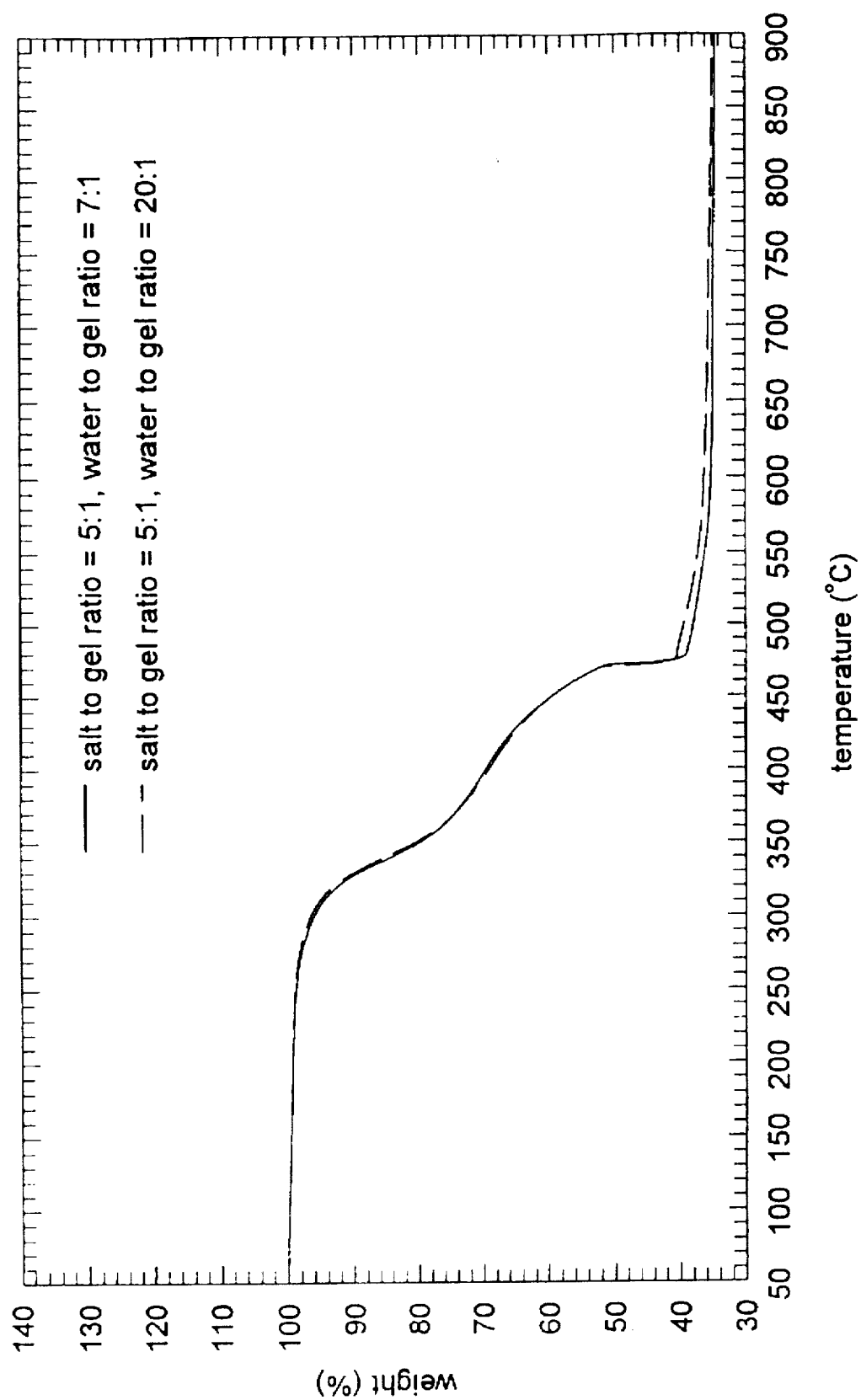
FIG. 20 shows TGA data from dried pre-milled precursor with a salt to resin ratio of 5:1 and water to resin ratios of 7:1 and 20:1.

Another effect of increasing the salt to resin ratio was that in order to achieve this ratio, the amount of water per gram of resin was increased (the water to resin ratios were 10:1 and 20:1 for the samples with salt to resin ratios of 0.5:1 and 15:1, respectively). This meant that the pores and openings in the swollen gel for the 15:1 precursor were larger than in the swollen gel for the 0.5:1 precursor. The effect of the water to resin ratio on the temperature of formation was studied using samples with a salt to resin ratio of 5:1 and water to resin ratios of 7:1 and 20:1. FIG. 20 shows TGA data from these samples. The TGA data indicated that the water to resin ratio had no effect on the temperature of formation.

The results set forth above reveal that the most important parameter, as far as the temperature of formation and final particle size are concerned, is the salt to resin ratio. This ratio is also indicative of the cost effectiveness of the technique. The higher the salt to resin ratio, the higher the yield. However, the high yield precursor (salt to resin ratio of 15:1) is not nearly as likely to lead to a loosely agglomerated, sub-micron powder. Therefore, efforts were focused on optimizing the powders derived from the low yield (0.5:1) and intermediate yield (5:1) precursors. Since the salt to resin ratio was fixed and the water to resin ratio was shown not to have a significant effect, the calcination schedule and the procedure for grinding the Y-TZP prior to particle size analysis were varied.

Figure 21:
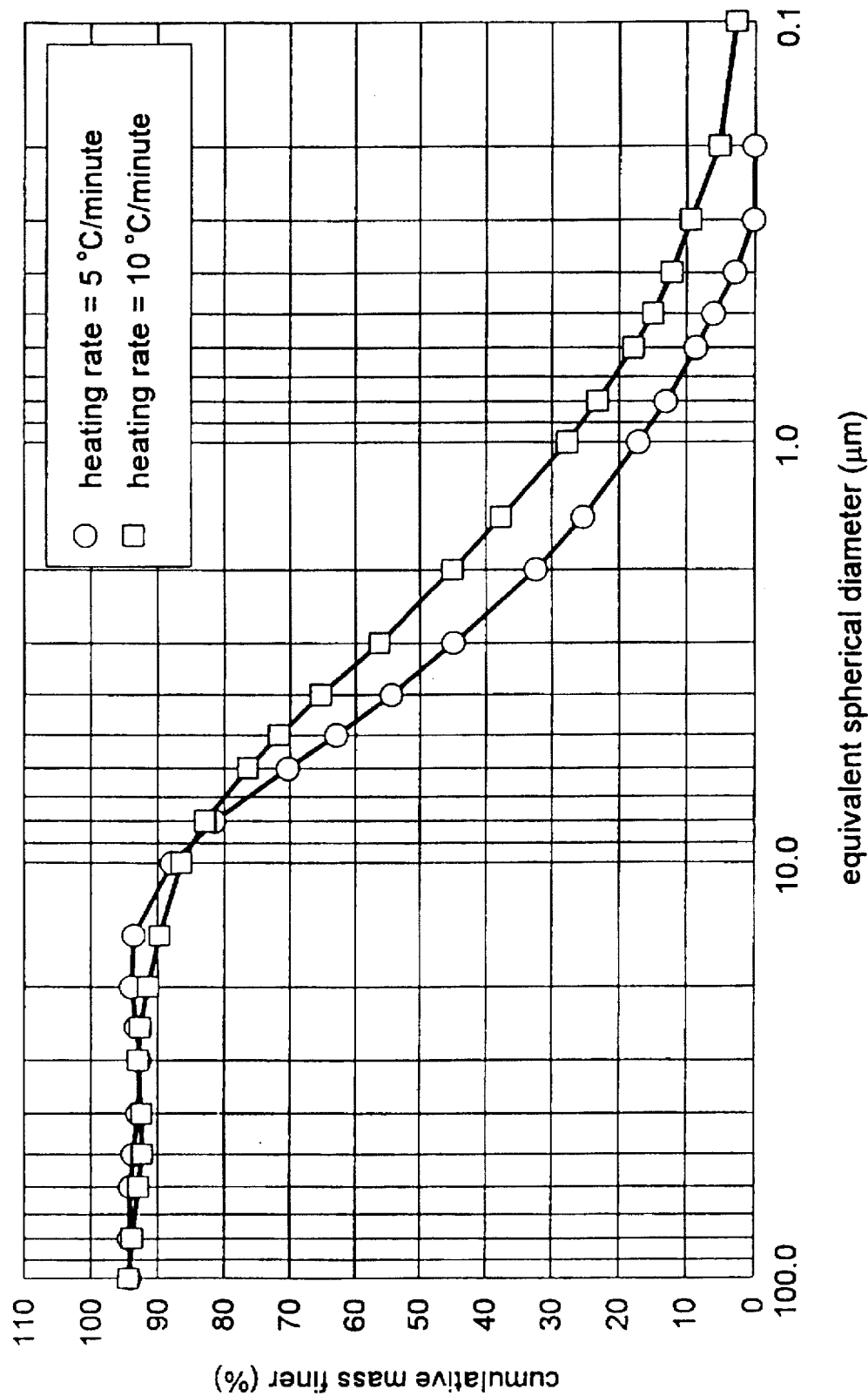
FIG. 21 shows particle size distributions of two ground zirconia powders from a precursor with a salt to resin ratio of 5:1. Both powders were calcined at 800° C. for one hour but were raised to this temperature at different rates.

As stated above, the calcination temperature for adequate carbon burn-off was found to be 700° C. for the 0.5:1 powder and 800° C. for the 5:1 powder. Since higher calcination temperatures than these would likely result in partial sintering, the calcination schedule was changed by varying the heating rate. FIG. 21 shows the particle size distributions of ground zirconia powders synthesized from pre-milled 5:1 precursor. Both powders were calcined at 800° C. for one hour, but one powder was heated to this temperature at a rate of 5° C./minute and the other at a rate of 10° C./minute. The size of the particles produced with the higher heating rate were slightly smaller. This might have been due to the difference in the heating rate. Another explanation is that at the higher heating rate, the powders were in the furnace for a shorter time. In either case, FIG. 21 shows that a reduction in the heating rate did not lead to a finer powder.

Experiments were conducted to determine the effect of milling parameters on the particle size distribution of the powders. Powders derived from both the 0.5:1 and 5:1 precursors were milled with mortar and pestle. Both the amount of material ground per milling session (50 and 100 mg) and the time per milling session (one and three minutes) were varied. The measured average particle size for all cases did not change significantly, and the particle size distributions were consistent with those shown in FIG. 16 for the 0.5:1 and 5:1 powders. The conclusion based on the results after varying the calcination schedule and the milling parameters is that Y-TZP synthesized through the invention technique is not easily reduced to a relatively uniform submicron powder.

In the course of efforts to produce a uniform submicron material, some interesting characteristics of the powder synthesized from the 15:1 precursor were discovered. As stated above, the drying of the 15:1 precursor led to non-homogeneous precipitation within the gel and, consequently, inconsistent TGA data. It was found that pre-milling the precursor led to consistent TGA data. All subsequent 15:1 powder was therefore produced from pre-milled precursor. However, prior to discovering the nonhomogeneous precipitation, powder from 15:1 precursor that was not pre-milled was sythesized. SEM analysis of this powder showed that it was comprised of macroporous, as well as non-porous, agglomerates. BET surface area measurements were performed in order to compare the porosity of this 15:1 sample to that of the powder derived from the 0.5:1 precursor, which did not exhibit any macroporosity. The BET surface area of the 15:1 powder ground after calcination was 45.2 m²/g, while that of the 0.5:1 powder ground after calcination was 36.3 m²/g. The ground 15:1 powder had an average particle diameter of approximately 10 µm, while the 0.5:1 powder had an average particle diameter of approximately 1 µm. The measured surface area is a function of both the external surface area of the particles as well as the internal surface area associated with the pores. Thus, the fraction of surface area in internal pores for the porous sample is at least an order of magnitude larger than for the nonporous, ground 0.5:1 powder.

In order to determine the effect of pre-milling on powder morphology, SEM analysis was performed on 15:1 powder derived from both precursor which was pre-milled and precursor which was not pre-milled. FIGS. 22A and 22B show SEM micrographs of these powders. In both cases, these powders were not ground following calcination. The macroporous morphology evident in the powder from the non-milled precursor was absent in the powder from the milled precursor. This suggests that the pores were created by evolution of gases from either the salt decomposition or the gel polymer pyrolysis.

While the invention has been described in detail and with reference to specific embodiments thereof, it will be apparent to one skilled in the art that various changes and modifications can be made therein without departing from the spirit and scope thereof.

What is claimed is:

1. A method for synthesis of a mixed metal oxide powder, said method comprising:

(a) combining a liquid absorbent resin with at least one solution containing at least two metallic salts, such that at least two metals are present in the liquid absorbent resin after said combining is completed;

(b) after said combining, swelling and gelling the liquid absorbent resin to form a swollen gel, wherein the liquid absorbent resin swells by absorbing said at least one solution;

(c) changing at least one of the pH and temperature of the swollen gel to form a precursor material;

(d) pyrolyzing the precursor material to form a pyrolyzed precursor material; and (e) calcining the pyrolyzed precursor material to form a mixed metal oxide powder;

wherein the at least one solution containing at least two metallic salts is combined with the liquid absorbent resin at a salt/resin ratio of 1 or less.

2. A method for synthesis of a mixed metal oxide powder as set forth in claim 1, wherein the salt/resin ratio is 0.5 or less.

3. A method for synthesis of a mixed metal oxide powder as set forth in claim 2, wherein the mixed metal oxide powder is yttria-stabilized tetragonal zirconia polycrystalline powder.

4. A method for synthesis of a mixed metal oxide powder as set forth in claim 1, wherein in step (c) the precursor material is formed by changing the temperature of the swollen gel to dry the swollen gel.

5. A method for synthesis of a mixed metal oxide powder as set forth in claim 2, wherein in step (c) the precursor material is formed by changing the temperature of the swollen gel to dry the swollen gel.

6. A method for synthesis of a mixed metal oxide powder as set forth in claim 3, wherein in step (c) the precursor material is formed by changing the temperature of the swollen gel to dry the swollen gel.

* * * * *